United States Patent
Jabara et al.

(10) Patent No.: US 10,387,918 B2
(45) Date of Patent: Aug. 20, 2019

(54) SYSTEM AND METHOD FOR RETAIL SALES USING WIRELESS COMMUNICATION DEVICES IN A WIRELESS COMMUNICATION NETWORK

(71) Applicant: E3, LLC, Newport Beach, CA (US)

(72) Inventors: Gary B. Jabara, Irvine, CA (US); Lloyd Frederick Linder, Agoura Hills, CA (US); David Brett Simon, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 557 days.

(21) Appl. No.: 13/838,272

(22) Filed: Mar. 15, 2013

(65) Prior Publication Data

US 2014/0108149 A1    Apr. 17, 2014

Related U.S. Application Data

(63) Continuation-in-part of application No. 13/398,727, filed on Feb. 16, 2012, now Pat. No. 9,064,374, which
(Continued)

(51) Int. Cl.
*G06Q 30/00* (2012.01)
*G06Q 30/02* (2012.01)
(Continued)

(52) U.S. Cl.
CPC ............ *G06Q 30/0267* (2013.01); *G01S 5/14* (2013.01); *G07F 17/3218* (2013.01);
(Continued)

(58) Field of Classification Search
CPC .................. G06Q 30/0207–30/0277
(Continued)

(56) References Cited

U.S. PATENT DOCUMENTS

2003/0065805 A1* 4/2003 Barnes, Jr. ............. G06Q 10/02
709/231
2006/0283941 A1* 12/2006 Singer-Harter ........ G06Q 30/02
235/383
(Continued)

OTHER PUBLICATIONS

ISA/US. Commissioner for Patents; Patent Cooperation Treaty (PCT) International Search Report; dated Sep. 4, 2014; Alexandria, Virginia 22313-1450.

*Primary Examiner* — Luis A Brown
*Assistant Examiner* — Allan J Woodworth, II
(74) *Attorney, Agent, or Firm* — Davis Wright Tremaine LLP

(57) ABSTRACT

A wireless network is established by direct communication between a user equipment (UE) and wireless access points within a shopping venue. After initial registration, the UE may be automatically authenticated upon entry into the shopping venue. In the venue, the UE sends a periodic signal that includes information from which the UE location within the venue may be determined. The system can develop a shopper profile based on the amount of time spent within the shopping venue, user purchases, and user-provided profile data even under circumstances where the specific identity of the user is not known. The customer analysis and profile generation can be used to produce individualized ads and offers for the UE. In addition, the analysis can develop a retail DNA rating for the user based on various factors, including responsiveness to advertising. A high retail DNA rating may result in even better advertising offers to the user.

32 Claims, 13 Drawing Sheets

Related U.S. Application Data is a continuation-in-part of application No. 13/363,943, filed on Feb. 1, 2012, now Pat. No. 9,179,296, which is a continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
*H04W 4/80* (2018.01)
*G07F 17/32* (2006.01)
*G01S 5/14* (2006.01)
*H04W 4/02* (2018.01)

(52) U.S. Cl.
CPC ......... *G07F 17/3223* (2013.01); *H04W 4/80* (2018.02); *H04W 4/02* (2013.01)

(58) Field of Classification Search
USPC .............................................. 705/14.1–14.73
See application file for complete search history.

(56) References Cited

U.S. PATENT DOCUMENTS

| | | | |
|---|---|---|---|
| 2007/0253382 A1* | 11/2007 | Ghassemzadeh | H04L 7/0008 370/338 |
| 2008/0004888 A1 | 1/2008 | Davis et al. | |
| 2011/0075612 A1 | 3/2011 | Guo et al. | |
| 2011/0157029 A1 | 6/2011 | Tseng | |
| 2011/0201275 A1 | 8/2011 | Jabara et al. | |
| 2011/0286343 A1* | 11/2011 | Powell | H04W 76/10 370/252 |
| 2012/0022930 A1* | 1/2012 | Brouhard | G06Q 30/02 705/14.22 |
| 2012/0184300 A1* | 7/2012 | Crandall | H04W 4/20 455/456.3 |
| 2013/0170432 A1* | 7/2013 | O'Brien | H04W 4/06 370/328 |

\* cited by examiner

SIGNAL STRENGTH

| LOCATION | A | B | C | D | E |
|---|---|---|---|---|---|
| $X_1$ | 0.60 | — | 0.50 | 0.50 | — |
| $X_2$ | 0.45 | — | 0.75 | 0.60 | — |
| $X_3$ | 0.35 | — | 0.80 | 0.55 | 0.33 |
| $X_4$ | — | 0.35 | 0.80 | 0.30 | 0.75 |

SYSTEM AND METHOD FOR RETAIL SALES USING WIRELESS COMMUNICATION DEVICES IN A WIRELESS COMMUNICATION NETWORK

RELATED APPLICATIONS

This application is a continuation-in-part of U.S. application Ser. No. 13/398,727 filed Feb. 16, 2012, now U.S. Pat. No. 9,064,374, which is a continuation-in-part of U.S. application Ser. No. 13/363,943 filed Feb. 1, 2012, now U.S. Pat. No. 9,179,296, which is a continuation-in-part of U.S. application Ser. No. 13/093,998 filed on Apr. 26, 2011, now U.S. Pat. No. 8,995,923, which is a continuation-in-part of U.S. application Ser. No. 12/958,296 filed on Dec. 1, 2010, now U.S. Pat. No. 9,077,564, which is a continuation-in-part of U.S. application Ser. No. 12/616,958 filed on Nov. 12, 2009, now U.S. Pat. No. 8,190,119, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

Field of the Invention

The present invention is directed generally to wireless communication devices and, more particularly, to a system and method of network management to permit retail shopping using short-range communication networks.

Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
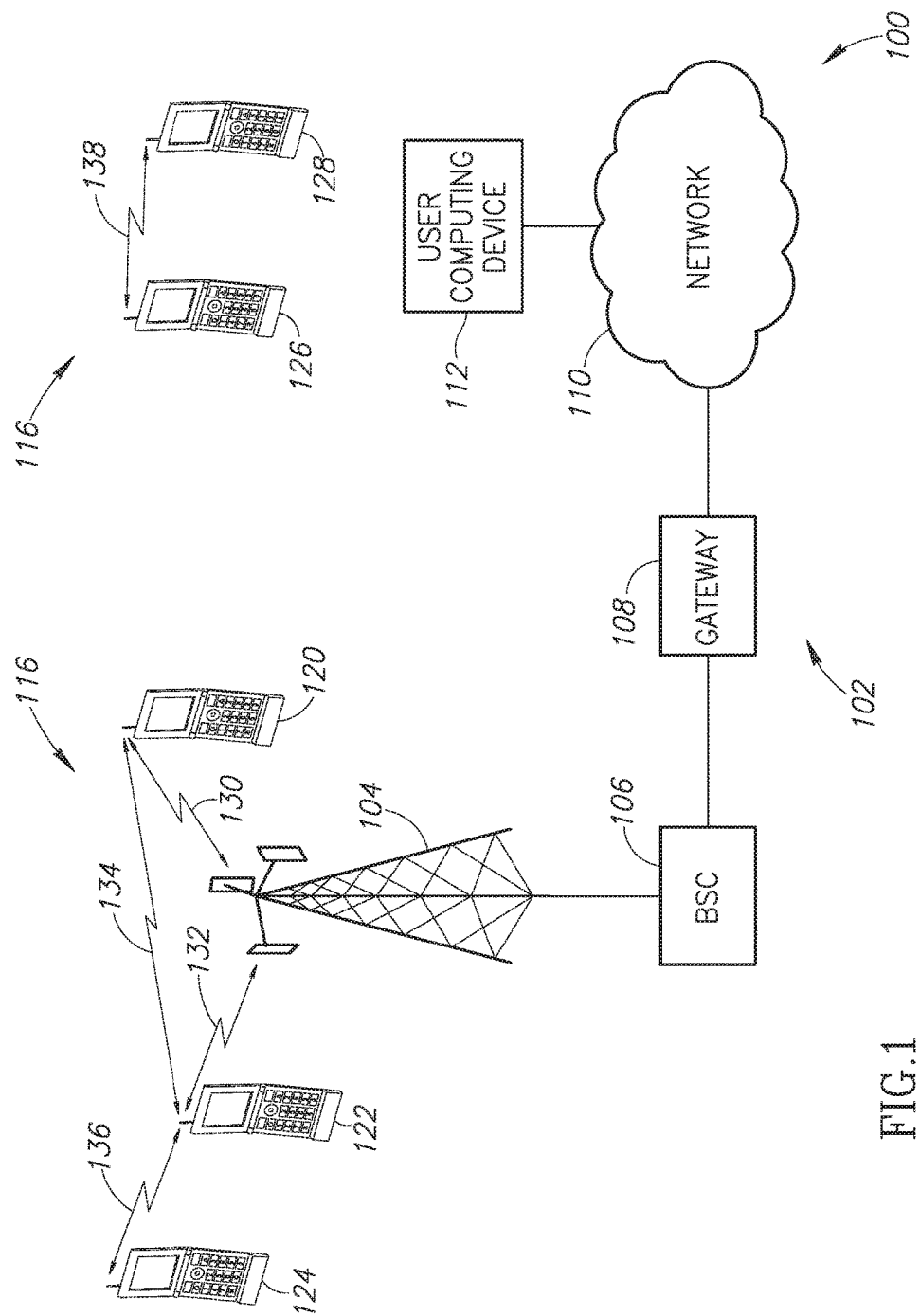
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional PLMN 102 includes a base station 104, which forms part of a radio access network (RAN) for a wireless service provider. The PLMN 102 may sometimes be referred to as a public land mobile network (PLMN). Those skilled in the art will appreciate that the typical PLMN 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the PLMN 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the PLMN 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the PLMN 102. The wireless communication devices 120-128 may be referred to generically as user equipment (UE). The term UE is intended to include any wireless communication device capable of processing audio, video, and text messaging. This includes smart phones, laptops, PDAs, computer tablets (e.g., an iPad™), and the like.

Those skilled in the art will appreciate that the PLMN 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the PLMN 102.

As illustrated in FIG. 1, the UE 120 communicates with the base station 104 via a wireless network communication link 130. Similarly, the UE 122 communicates with the base station 104 via a wireless network communication link 132. Each of the UEs illustrated in FIG. 1 (e.g., the UEs 120-128) contain a conventional transmitter/receiver or transceiver components to permit conventional communication with the PLMN 102 via the base station 104 or other base station (not shown). Operational details of conventional network communication are known in the art and need not be described in greater detail herein.

In addition to the conventional network transceiver components, the jump-enabled UEs illustrated in FIG. 1 (e.g., the UEs 120-128) also include a second short-range transceiver to allow direct communication between the devices. This short-range communication is accomplished without reliance on the PLMN 102. Indeed, as will be described in greater detail below, the short-range transceivers in the mobile communication devices 120-128 permit the dynamic formation of a short-range communication network 116 that does not rely on the PLMN 102 provided by any wireless service provider. Thus, UEs can rely on the conventional PLMN 102 for some communications, but may also be part of the short-range communication network 116 formed between the mobile devices themselves. In the example of FIG. 1, the UE 120 communicates with the base station 104 via the wireless network communication link 130. Similarly, the UE 122 communicates with the base station 104 via the network wireless communication link 132. However, in addition, the UEs 120 and 122 may communicate directly with each other via a short-range communication link 134.

As illustrated in FIG. 1, the UE 124 is not in communication with the PLMN 102. However, the UE 124 can communicate directly with the UE 122 via a short-range wireless communication link 136. Also illustrated in FIG. 1 are the UEs 126-128. Although neither of these devices is in communication with the PLMN 102, the two devices are in direct communication with each other via a short-range wireless communication link 138. Thus, jump-enabled UEs must be in proximity with each other, but need not be in communication with the PLMN 102 or even in an area of wireless coverage provided by the wireless communication network.

The dynamic formation of one or more short-range networks 116 allows communication between the wireless communications devices 120-128 independent of the PLMN 102 even if the PLMN 102 is present and operational. The short-range communication network 116 advantageously allows communication in settings where the PLMN 102 is not present or in a situation where the wireless communication network is unavailable. For example, the PLMN 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled UEs move throughout a geographic location.

Figure 2:
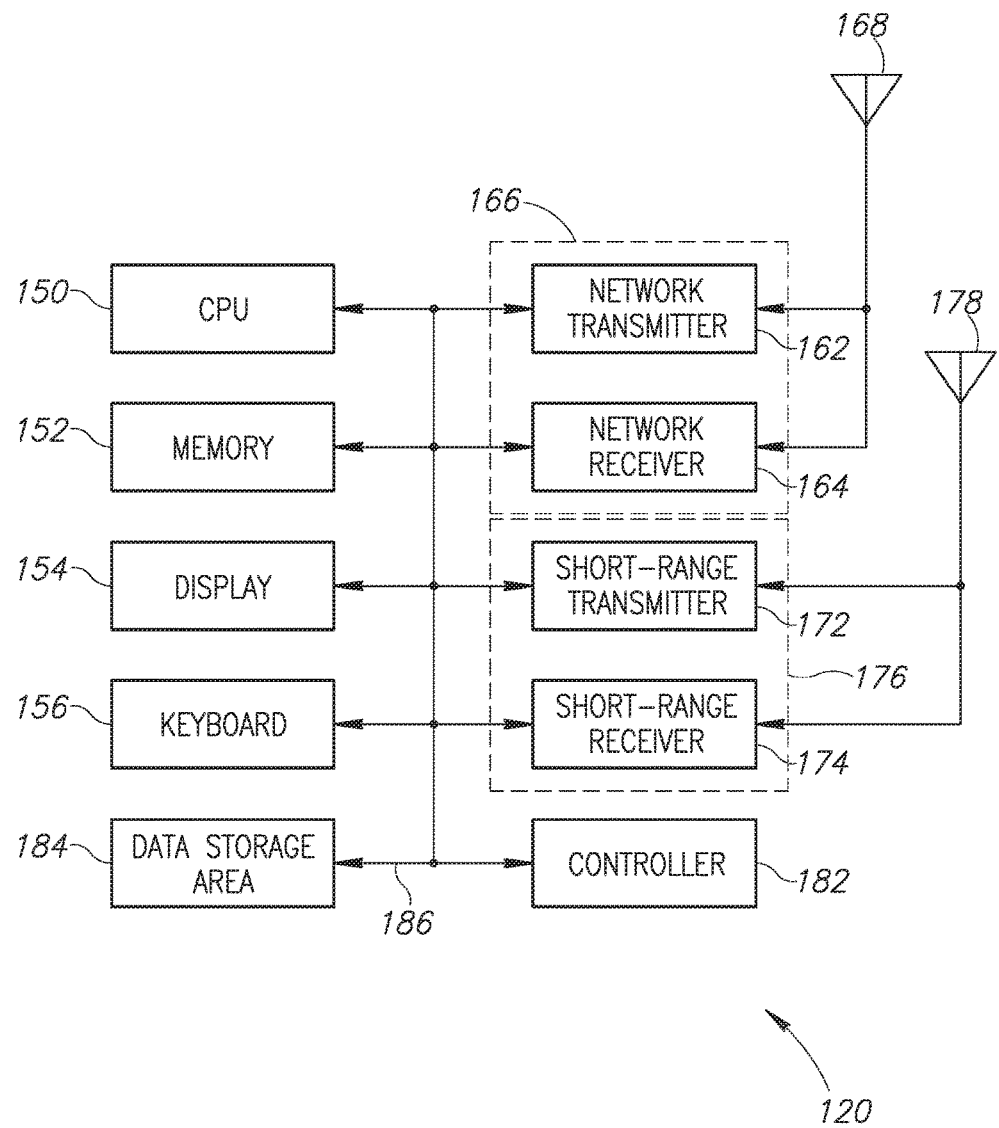
FIG. 2 is functional block diagram of one of the wireless communication devices of FIG. 1.

FIG. 2 is a functional block diagram illustrative of one of the UEs illustrated in FIG. 1 (e.g., the UE 120). The UE 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The UE 120 is not limited by the specific form of the CPU 150.

The UE 120 in FIG. 2 also contains a memory 152. In general, the memory 152 stores instructions and data to control operation of the CPU 150. The memory 152 may include random access memory, ready-only memory, programmable memory, flash memory, and the like. The UE 120 is not limited by any specific form of hardware used to implement the memory 152. The memory 152 may also be integrally formed in whole or in part with the CPU 150.

The UE 120 of FIG. 2 also includes conventional components, such as a display 154 and a keypad or keyboard 156. These are conventional components that operate in a known manner and need not be described in greater detail. Other conventional components found in UEs, such as a USB interface, Bluetooth interface, camera/video device, infrared device, and the like, may also be included in the UE 120. For the sake of clarity, these conventional elements are not illustrated in the functional block diagram of FIG. 2.

The UE 120 of FIG. 2 also includes a network transmitter 162 such as may be used by the UE 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the PLMN 102 is well-known in the art and need not be described in greater detail herein.

The UE 120 of FIG. 2 also includes a short-range transmitter 172 that is used by the UE 120 for direct communication with other jump-enabled UEs (e.g., the UE 122 of FIG. 1). FIG. 2 also illustrates a short-range receiver 174 that operates in conjunction with the short-range transmitter 172 to communicate directly with other jump-enabled UEs (e.g., the UE 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between UEs that become part of the short-range communication network 116. The data storage 184 contains user profile data and messaging data that will be exchanged between UEs in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between UEs. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled UE 120 comes within range of any other jump-enabled UE (e.g., the UE 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern UEs are equipped with WiFi and may be readily upgraded to support the functionality described herein. Because the UEs 120-128 all include WiFi capability, short-range communication networks 116 may be formed even though the UEs may be designed to operate with incompatible PLMNs 102. For example, the UE 122 may be configured for operation with a GSM implementation of the PLMN 102. The UE 124 may be configured for operation with a CDMA implementation of a PLMN 102. Even though the UEs 122-124 are incompatible with respect to the respective PLMNs 102, the UEs 122-124 may still communicate directly with each other via the short-range communication network 116. Thus, the UEs 120-128 may operate compatibly to form the short-range communication networks 116 even though the network transceivers 166 (see FIG. 2) may operate with different incompatible PLMNs 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

In accordance with IEEE 802.11, two WiFi devices must be associated with each other to exchange data. This technique is well known in the use of personal computers where a WiFi connection may be established between a PC and a wireless router or wireless access point (WAP) at home, at the office, or some public location (e.g., an airport, coffee shop, and the like) that provides a wireless "hot spot." In this conventional operation, the user of the PC must enable a process to seek out any nearby WiFi wireless router or WAP. When one or more wireless routers are detected, the user manually selects a wireless router with which to communicate. In a setting such as an airport, the WAP is typically unencrypted and broadcasts an identification in the form of a service set identifier (SSID). For example, the SSID in the Los Angeles International Airport may, for example, be broadcast as "LAX Wireless Service."

In a home wireless network, the wireless router will also have an SSID (e.g., The Smith Family). In addition, a home wireless router may include known forms of encryption such as WEP, WPA-2, or the like. If encryption is selected, the wireless router will have an encryption key. For successful communication with an encrypted router, the PC user must select that router when viewing the list of available WiFi connections and provide the appropriate encryption key to match the encryption key for the selected wireless router.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS) or a frequency hopping spread spectrum (FHSS) operational modes. These conventional WiFi parameters are known in the art and need not be described in greater detail herein.

In an exemplary embodiment, the MAC is implemented in accordance with IEEE 802.2. At the PHY layer, the transceiver may operate in a DSSS or a FHSS operational mode. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
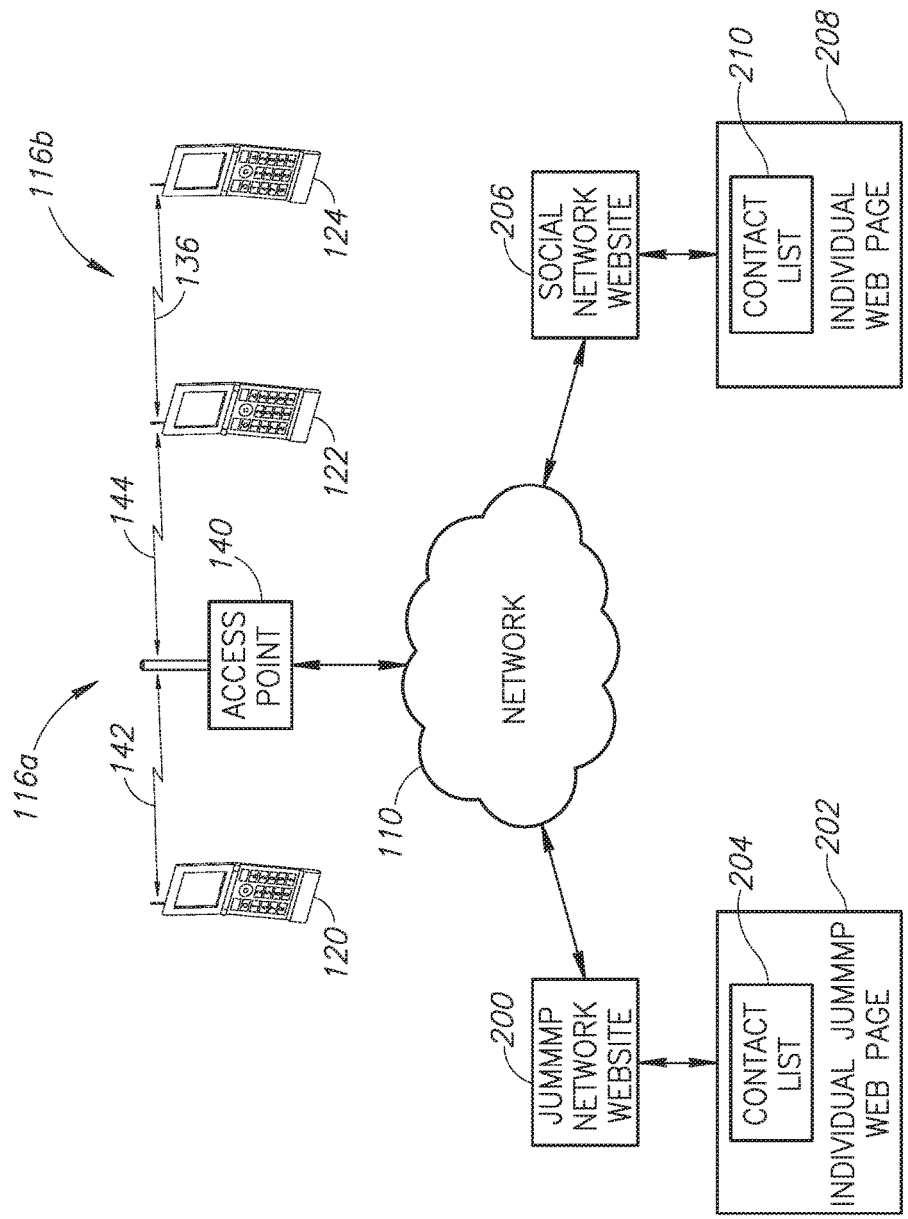
FIG. 3 illustrates an embodiment of the system of FIG. 1 using an access point as part of a network.

In yet another alternative embodiment, illustrated in FIG. 3, the jump-enabled UEs (e.g., the UEs 120-122) may communicate with an access point (AP) 140, such as a WiFi base station, WAP, wireless router, or the like. As will be described in greater detail below, a UE (e.g., one of the UEs 120-124) may function as the AP 140 to permit others of the UEs in the short range communication network 116 to access the network 110 via the UE serving as the AP. FIG. 3 illustrates a wireless communication link 142 established between the AP 140 and the UE 120. Similarly, the UE 122 establishes a wireless communication link 144 with the AP 140. Thus, a short-range communication network 116a is formed in conjunction with the AP 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the UEs 120-124, there may be one or more short-range communication networks 116 formed. In the example of FIG. 3, the UEs 120-122 are both within range of the AP 140. Therefore, the first short-range communication network 116a can be formed with the UEs 120-122 and the AP 140.

The UE 124 is within range of the UE 122, but is not within range of the AP 140. In one embodiment, the UE 124 may be become part of the short-range communication network 116a via the UE 122. In this embodiment, the UE 122 functions as a "repeater" or relay to relay information between the UE 124 and other parts of the short-range communication network 116a. In another embodiment, a second short-range communication network 116b is formed with the UEs 122-124. In this exemplary embodiment, the UE 122 is part of both short-range communication networks 116a-116b. The UE 122 may simultaneously be a member of both short-range communication networks 116a-116b or may be logically connected to both short-range communication networks 116a-116b by alternately switching between the short-range communication networks 116a-116b.

The AP 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

Figure 14:
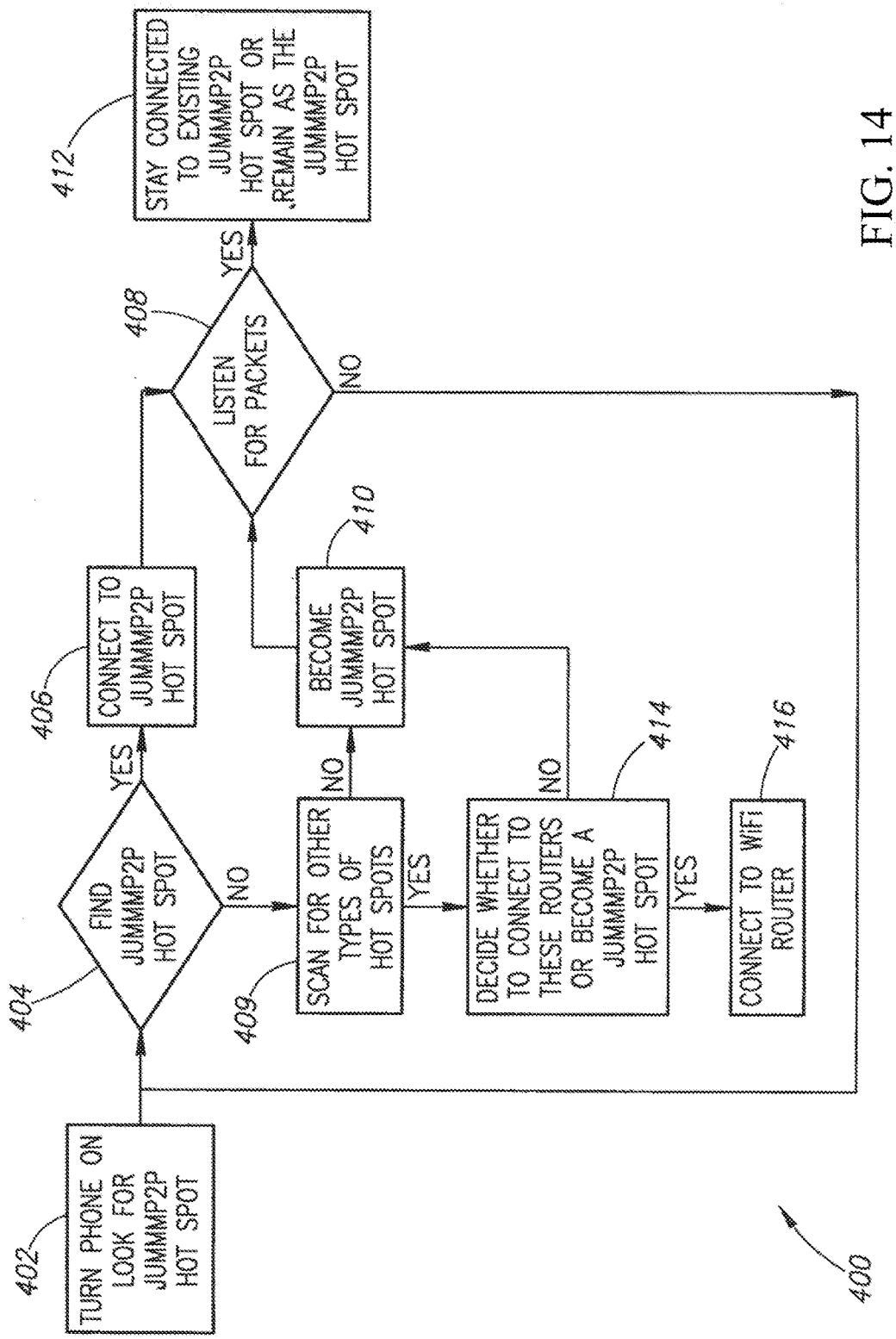
FIG. 14 is a flowchart illustrating the operation of wireless communication device in the dynamic formation of short-range communication networks.

FIG. 14 illustrates a flow chart 400 illustrating an exemplary embodiment of self-management by individual ones of the wireless communication devices (e.g., the wireless communication device 120). At step 402, the user turns on or otherwise enables the short-range transceiver 176 (see FIG. 2) and the wireless communication device searches for a hot spot. Those skilled in the art will appreciate that the term "hot spot" may typically refer to the access point 140. However, in the present embodiment, a hot spot refers to any wireless device (e.g. the access point 140 or any wireless communication device) that is configured to broadcast a beacon signal identifying the device as available for communication with other wireless communication devices. In the example described above, a wireless hot spot is configured to transmit a beacon signal containing the SSID "JUMMMP." In this exemplary embodiment, the wireless communication device searches for a hot spot transmitting the SSID "JUMMMP."

In decision 404, the wireless communication device (e.g. the wireless communication device 120) determines whether it has discovered a JUMMMP hot spot. If the wireless communication device has discovered a JUMMMP hot spot, the result of decision 406 is YES and, in step 406, the wireless communication device connects to the discovered hot spot.

In decision 408, the wireless communication device listens for data packets to determine whether any data packets are available from the discovered hot spot. If data packets, such as messages, are available from the discovered hot spot, the result of decision 408 is YES and, messages are exchanged between the wireless communication device and the hot spot. An example data exchange process is described above with respect to FIG. 5.

Returning to decision 404, if the wireless communication device (e.g. the wireless communication device 120) is unable to detect a JUMMMP hot spot, the result of decision 304 is NO and, in decision 409, the wireless communication device scans for other types of hot spots other than a JUMMMP hot spot. If no other type of hot spot is available, the result of decision 409 is NO, and in step 410, the wireless communication device itself becomes a hot spot. In operation, the wireless communication device is configured to transmit a beacon signal and will serve as a hot spot for other nearby wireless communication devices. In the example presented herein, the wireless communication device that becomes a hot spot will transmit a beacon signal with the SSID JUMMMP.

Following step 420, the wireless communication device/hot spot also listens for data packets in decision 408. In this implementation of decision 408, the wireless communication device/hot spot is listening to detect other wireless communication devices that may attach thereto. When another wireless communication device (e.g. the wireless communication device 122 in FIG. 4) detects the wireless communication device/hot spot, it will establish a communication link therewith and exchange messages. If data packets are to be exchanged, the result of decision 408 is YES.

In an exemplary embodiment, the wireless communication devices will continue to operate as the short-range communication network 116 so long as the wireless communication devices are connected to a hot spot. As discussed above, the hot spot may be a router, wireless access point, or another one of the wireless communication devices. In step 412, the wireless communication device will stay connected to the existing JUMMMP hot spot or will remain as the JUMMMP hot spot so long as other devices are connected therewith to form the short-range communication network 116.

In an alternative embodiment, the controller 182 (see FIG. 2) may include a timing element that will cause the wireless communication device (e.g., the wireless communication device 120) connected to a hot spot to periodically disconnect from that hot spot and scan for other JUMMMP hot spots even if the result of decision 408 is YES. If another JUMMMP hot spot is discovered by the wireless communication device as a result of implementation of this search, the wireless communication device can execute step 406 to connect to the new JUMMMP hot spot. The wireless communication device will execute other steps as described above with the new hot spot to exchange data (e.g., messages) and to synchronize the data storage area 184 of each wireless communication device within the particular short-range communication network 116.

Returning to decision 408, if no data packets or messages are detected by the wireless communication device connected to a JUMMMP hot spot, the result of decision 408 is NO. In that event, the wireless communication device ceases communication with that hot spot and scans for a different JUMMMP hot spot in decision 404. If a different JUMMMP hot spot is detected, the result of decision 404 is YES and the system 100 returns to step 406 to connect to the newly discovered JUMMMP hot spot and will exchange messages therewith in the manner previously described.

Returning to decision 409, if the wireless communication device detects other types of hot spots, the result of decision 409 is YES. In that case, the wireless communication device moves to decision 414 to determine whether to connect to the non-JUMMMP hot spot or to become a JUMMMP hot spot. The wireless communication device may elect to connect to a non-JUMMMP hot spot in order to gain access to a router or other gateway device. If the wireless communication device decides to connect to the non-JUMMMP hot spot, the result of decision 414 is YES and, in step 416, the wireless communication device connects to the WiFi router or other device, such as a wireless modem or other access point. If the wireless communication device decides not to connect to the non-JUMMMP hot spot, the result of decision 414 is NO and the wireless communication device becomes a JUMMMP hot spot in step 410.

Thus, a wireless communication device in the embodiment of FIG. 14 will remain connected to a JUMMMP hot spot so long as they remain within range of each other and continue to exchange data. Even though it may be connected to a JUMMMP hot spot, a different wireless communication device will disconnect and scan for other JUMMMP hot spots if no data is being received from the present JUMMMP hot spot or may periodically disconnect from the present JUMMMP hot spot to search for other nearby JUMMMP hot spots. Furthermore, those skilled in the art will appreciate that mobile devices may change location. A user may be temporarily stationary or may be walking or riding in a vehicle. Thus, wireless communication devices may move in and out of range of a JUMMMP hot spot on a relatively frequent basis. Similarly, a wireless communication device serving as the JUMMMP hot spot may itself be mobile and move out of range of other wireless communication devices within the dynamically formed short-range wireless communication network. Thus, each wireless communication device manages its own activities and can connect or disconnect from JUMMMP hot spots or, in the absence of another JUMMMP hot spot, may be configured to become a JUMMMP hot spot so that others may connect to it.

During the operational set-up of a short-range communication network 116, the designated hot spot (e.g., the access point 140 or any wireless communication device, such as one of the wireless communication devices 120-128) transmits the designated SSID, as described above. The hot spot device assigns a MAC address to each wireless communication device attempting to connect to the hot spot. In an exemplary embodiment, each of the wireless communication devices within a particular short-range communication network 116 is assigned the same MAC address. This will permit the free exchange of communications among the wireless communication devices of the short-range communication network 116.

As will be discussed in greater detail herein, the level of user activity in a retail shopping venue can be measured and the user assigned a "Retail DNA" rating. An individual with a high Retail DNA rating is one who is more active in a shopping venue, spends more time in the store, purchases more goods, responds to more advertisements, spends more money, and the like. The shopping experiences of a user across multiple retail venues can be combined to generate a Retail DNA rating for the user. Users can manage their Retail DNA rating using the JUMMMP Network website 200 or the social network website 206. The user logs on to the individual web page 202 or 208 to view their Retail DNA rating, view purchase history, manage redeemable points, view their virtual account information, view advertising delivered to the web page, and the like. The user can also manage social interactions with other users on the web site 200.

The system 100 also gives shoppers the ability to identify other shoppers that are part of the JUMMMP network and communicate with other shoppers using, by way of example, text messaging to notify other shoppers of sale opportunities. A message, such as "Come to the sock department and get 2 for 1" can be sent as a Public Message, Group Message, or Direct Message.

As discussed in detail in co-pending U.S. application Ser. No. 12/616,958, filed on Nov. 12, 2009 and assigned to the assignee of the present application, the user of a jump-enabled UE (e.g., the wireless device 120) may use the web-browsing capability of the UE to access the individual jump web page 202 for the individual with whom contact has just been made to learn more about that individual. Alternatively, the user of a jump-enabled UE (e.g., the wireless device 120) may use the web-browsing capability of the UE to access the user's own individual jump web page 202 to store information for the individual with whom contact has just been made. A contact list 204, which is typically a portion of the individual jump web page 202 is configured to store contact information. Similarly, the individual jump web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The UEs 120-128 (see FIG. 1) generally have sufficient memory capacity to temporarily store contact information. In an exemplary embodiment, the UE (e.g., the UE 120) can temporarily store new contact information until access to the network 110 becomes available at a later time. In addition, the UE 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The UE 122 may access the network 110 by communicating directly with the base station 104. In the embodiment of FIG. 3, access to the network 110 may be provided via the AP 140, as described above. For example, the UE 122 in FIG. 1 may access the network 110 by communicating directly with the AP 140 via the short-range communication link 144. Alternatively, the UE 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled UE. For example, in FIG. 1, the UE 122 can communicate with the base station 104 via the wireless communication link 132 while the UE 124 cannot communicate directly with the base station. However, the UE 124 is in proximity with the UE 122 and can communicate with the UE 122 via the wireless communication link 136 as part of the short-range communication network 116. In this embodiment, the UE 124 can use the UE 122 as a repeater or relay to allow the UE 122 to access the network 110 via the UE 122 and the base station 104.

Similarly, in the embodiment of FIG. 3, the UEs 120-122 can communicate directly with the AP 140 via the wireless communication links 142-144, respectively. The UEs 120-122 can also communicate with each other via the AP 140 thus forming the short-range communication network 116*a*. As seen in FIG. 3, the UE 124 cannot communicate directly with the AP 140. However, the UE 124 is in proximity with the UE 122 and can communicate with the network 110 via the UE 122 and the AP 140.

Figure 4:
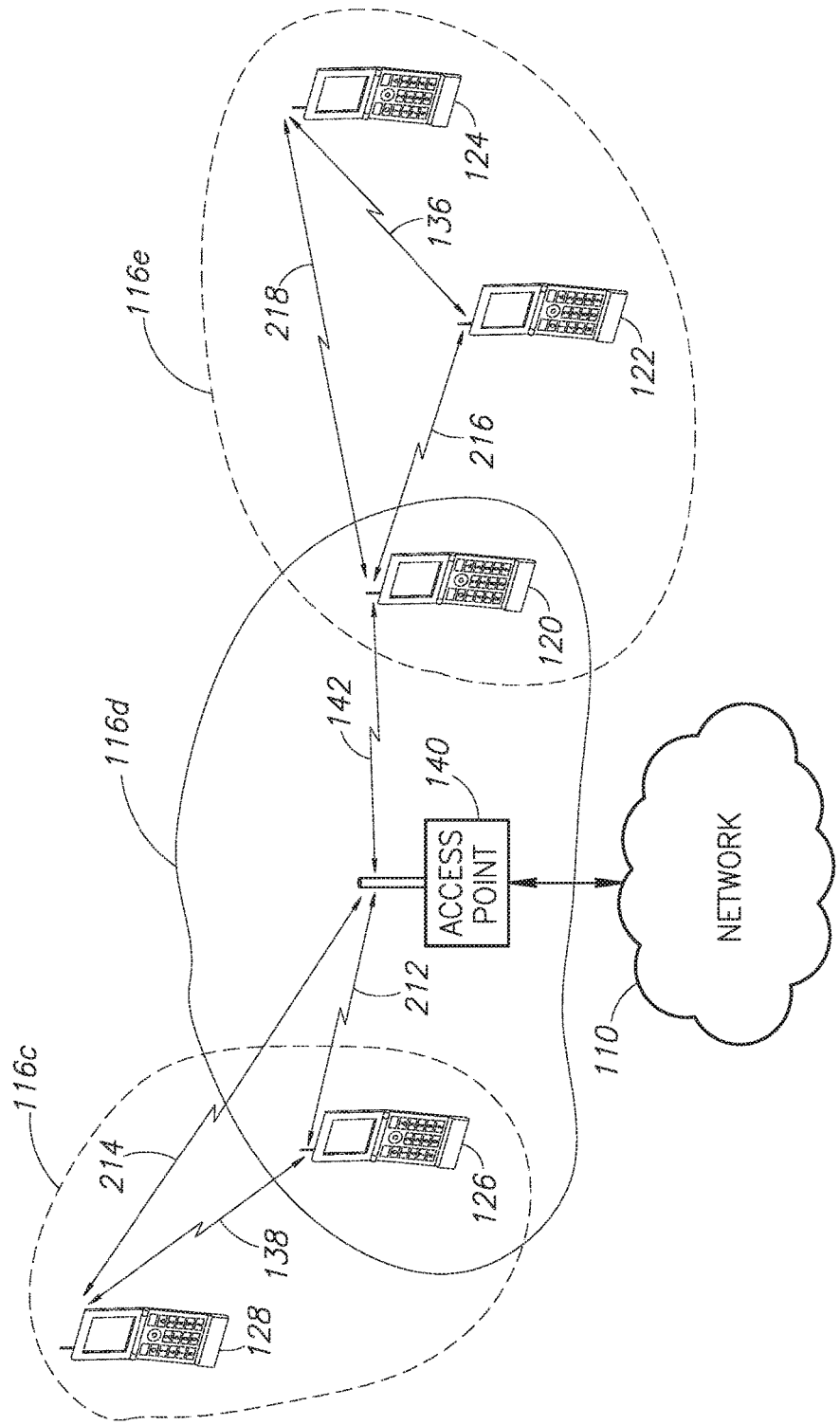
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the UEs 120-124 and a second short-range communication network 116 formed between the UEs 126-128. FIG. 4 illustrates the dynamic nature of the wireless communication networks 116. For example, if the UE 128 is initially within range of the UE 126, but out of range of the AP 140, the UEs 126-128 may form a short-range communication network 116*c* using the short-range communication link 138. If the UE 126 comes within range of the AP 140, a wireless communication link 212 is formed. In that event, the UE 126 may become part of a short-range communication network 116*d* formed between the AP 140 and the UEs 120 and 126. At this particular moment in time, the mobile communication device 126 may be part of both the short-range communication network 116*c* and the short-range communication network 116*d*. As discussed above, the UE 126 may actually be part of both the short-range communication networks 116*c*-116*d* or may logically be connected to both the short-range wireless communication networks by switching back and forth between the short-range communication networks 116*c*-116*d*. The logical switching between the short-range communication networks 116*c*-116*d* is transparent to the user. Other examples of the short-range communication network 116 are described below in which no AP 140 is present.

Alternatively, the UE 128 may become part of the short-range communication network 116*d* using the UE 126 as a relay to the AP 140. If, at a later time, the UE 128 comes within range of the AP 140, a wireless communication link 214 is formed there between. At that point in time, the short-range communication network 116*c* effectively ceases to exist since the UEs 126-128 are now part of the short-range communication network 116*d*.

The UE 120 may be part of the short-range communication network 116*d* by virtue of the short-range communication link 142 coupling the UE 120 to the AP 140. If the UE 120 comes within range of the UEs 122-124, wireless communication links 216-218 will be formed to couple the UEs 120-124 and thereby dynamically form a short-range communication network 116*e*. At this point in time, the UE 120 may simultaneously be part of the short-range communication network 116*d* and the short-range communication network 116*e*. Alternatively, the UEs 122-124 may become part of the short-range communication network 116*d* via the UE 120.

If the UE 120 subsequently moves out of range of the AP 140, the wireless communication link 142 is broken. Therefore, there will no longer be an overlap between the short-range communication networks 116*d*-116*e*. The UE 120 would remain part of the short-range communication network 116*e* so long as it remains within range of the UE 122, the UE 124, or both. Thus, those skilled in the art will appreciate that short-range communication networks are dynamically formed, modified, and dissolved as the UEs move in and out of range with each other and central points, such as the AP 140. Furthermore, if the UE 120 comes back into range of the AP 140, the wireless communication link 142 can be reestablished. When this happens, all prior communications from the short-range communication network 116*e* will be transferred to the short-range communication networks 116*d* and 116*c* (and vice-versa) through the re-echoing function described above. That is, the various UEs will resynchronize the data in the data storage area 184 (see FIG. 2). Those skilled in the art will also appreciate that the short-range communication networks 116 may be formed, modified, and dissolved without the presence of the AP 140.

FIG. 4 illustrates the UE 120 as a key component in the short-range communication network 116*e* because it connects the UEs 122-124 to the AP 140. If the UE 120 suddenly moved out of range of the AP and/or the UEs 122-124 that connection may be broken. Similarly, if the user of the UE 120 suddenly turned off the device, the link between the short-range communication network 116e and the AP 140 would disappear. The UEs 122-124 still communicate with each other via the wireless communication link 136 and will still search for other UEs with which to connect. In addition, either of the UEs 122-124 will attempt to find the AP 140 or a hot spot from which either of the UEs may access the network 110.

FIG. 4 illustrates a sparse network with only five UEs. However, those skilled in the art can appreciate that there may be a very large number of UEs in proximity with each other. For example, if FIG. 4 is illustrative of a large shopping mall, there may be hundreds of UEs within the mall. Thus, the short-range communication networks 116 may be large and extensive. There may be a large number of UEs that are simultaneously present in two or more short-range communication networks 116. In addition, many UEs would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the UE 120 is turned off or moved out of range of other UEs is less likely to cause the total isolation of the short-range communication network 116e. If the UE 120 were suddenly removed, either by powering down or by the departure from the area, many other UEs (not shown) in the same proximity would be able to replace the connectivity between the short-range communication network 116e and the AP 140.

Whenever a UE (e.g., the UE 124) comes within range of other UEs, a short-range wireless communication network (e.g., the short-range wireless communication network 116e), the UEs exchange message data with each other to thereby synchronize message data in the data storage area 184 (see FIG. 2). At the end of the synchronization process, the data storage area 184 of each UE will contain the same message data, although messages may not be in the same sequence. In the example described above, when the UE 124 comes within range of the UE 120 and/or the UE 122, the wireless communication links 136 and 218 are formed. Because the UE 124 has just joined the short-range communication network 116e, the data storage area 184 of the UE 124 will not be synchronized with the data storage area of other UEs in the short-range communication network 116e. During the synchronization process, the UE 124 transmits message data in its data storage area 184. The UEs 120 and 122 receive the message data. The controller 182 (see FIG. 2) in each UE receives the message data and merges the messages with the message data already stored within the data storage area 184 of the UEs 120 and 122, respectively. The controller 182 in each of the UEs may also eliminate duplicate messages. In this manner, each UE manages the message data within its data storage area 184.

As part of the synchronization process, the UEs 120 and 122 may also transmit the message data within their respective data storage areas 184. The UE 124 receives the messages from the UEs 120 and 122 and merges the newly received messages in the data storage area 184 of the UE 124. As described above, the controller 182 (see FIG. 2) of the UE 124 may eliminate duplicate messages within its data storage area 184. Following this synchronization process, all UEs in the short-range communication network 116e will have identical messages.

In an exemplary embodiment, the messages may be categorized as Public Messages, Group Messages, Direct Messages, and Status Messages. Public Messages may be transmitted to anyone within range of the UE (e.g., the UE 120). This may include emergency messages, messages broadcast from a retailer, and the like. Group Messages are intended for a specific group or organization, such as a scout group or employees of a particular company or any formed group. Direct Messages are private messages intended for a specific individual. In addition, the UE 120 may transmit Status Messages, which can include, by way of example, a list of other UEs in the particular short-range communication network 116, a list of recent UEs in the particular short-range communication network, a list of other short-range communication networks in which the UE was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," filed on Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the UE with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any UE. In contrast, Group Messages may only be processed by a member of the designated group, while a Direct Message may only be processed by the individual UE for whom the message is intended.

Synchronization may occur directly between the UEs or via the AP 140 illustrated in FIG. 4. For example, message synchronization can occur between the UE 120 and the UE 126 using the AP 140. In addition, as will be described in greater detail below, UEs can carry message data as they move from one short-range communication network to another.

In another embodiment, a retail business may broadcast Public Messages to nearby UEs. In an exemplary embodiment, the retail facility can set up a wireless AP (e.g., the wireless AP 140 in FIG. 3) to establish a short-range communication network 116. For example, a retail facility in a shopping mall can transmit advertisement messages to nearby UEs. In a typical embodiment, these would be Public Messages that are freely relayed from one UE to another and from one short-range wireless communication network 116 to another. Using this form of message distribution, an advertisement from a retail facility will soon be disseminated to all wireless users in the area. The advertisements may take the form of text messages, notifications, or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data, including shopping history, that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the UEs in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Figure 5:
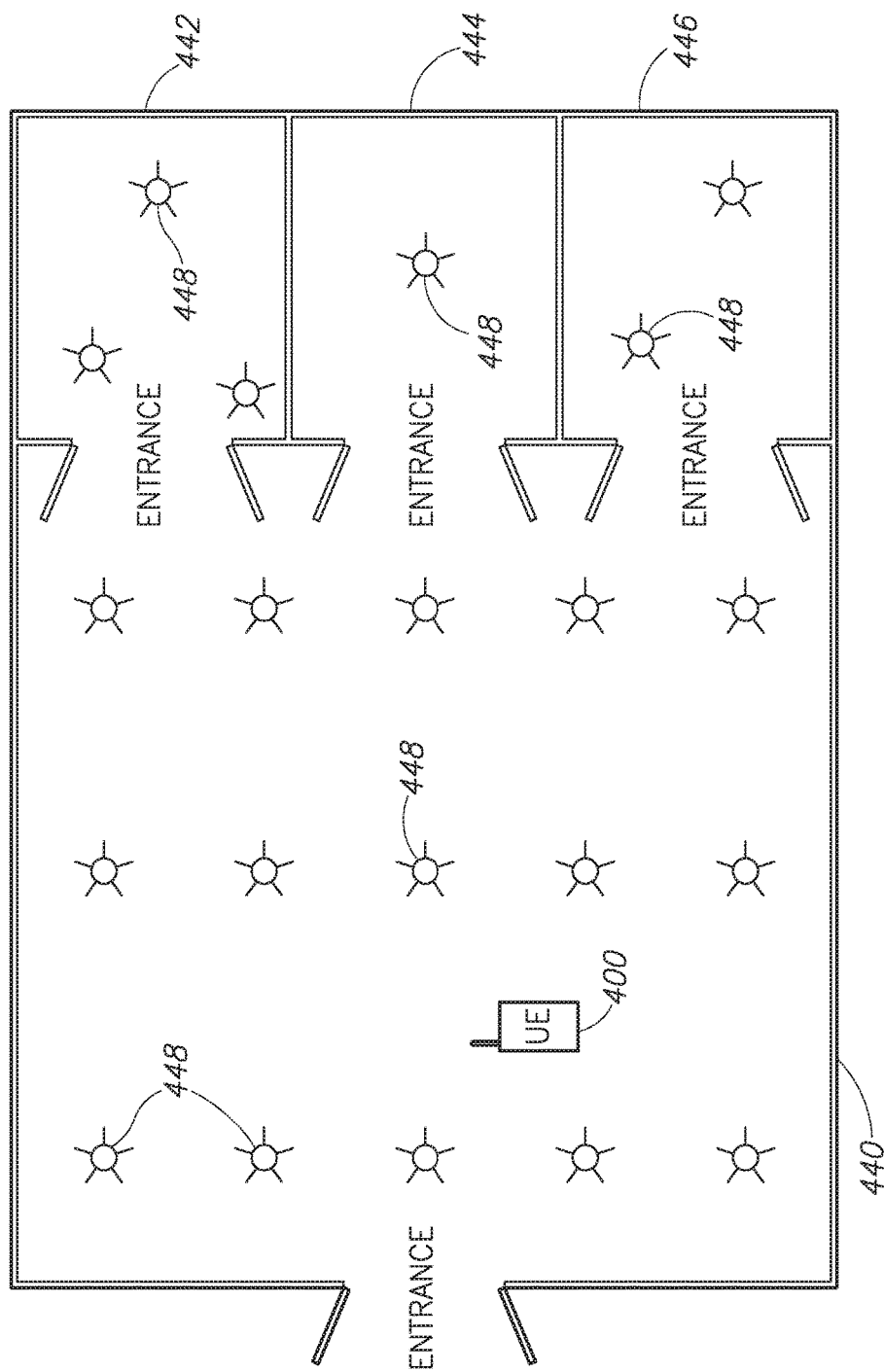
FIG. 5 illustrates a venue with a large number of distributed wireless access points.

FIGS. 3 and 4 illustrate a single AP to facilitate communication between ones of the UEs. However, in a different embodiment, a particular location may have a large number of APs to facilitate communication between the venue and a large number of individual UEs. FIG. 5 illustrates a large venue 440, such as a retail facility or department store. In such a large venue, there may be related businesses 442-446 located within or near the venue 440. In the department store example, the related business 442 may be a coffee shop that is owned by the department store, or maybe an independent facility in space leased from the department store. The related business 444 may be a particular department (e.g., a shoe department) that is owned by the department store or may be an independently owned business that leases the space from the department store. The related business 446 may be, by way of example, a restaurant. Alternatively, the venue 440 in FIG. 5 may illustratively represent a shopping mall and the venues 442-446 represent individual stores within the shopping mall.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

Figure 8:
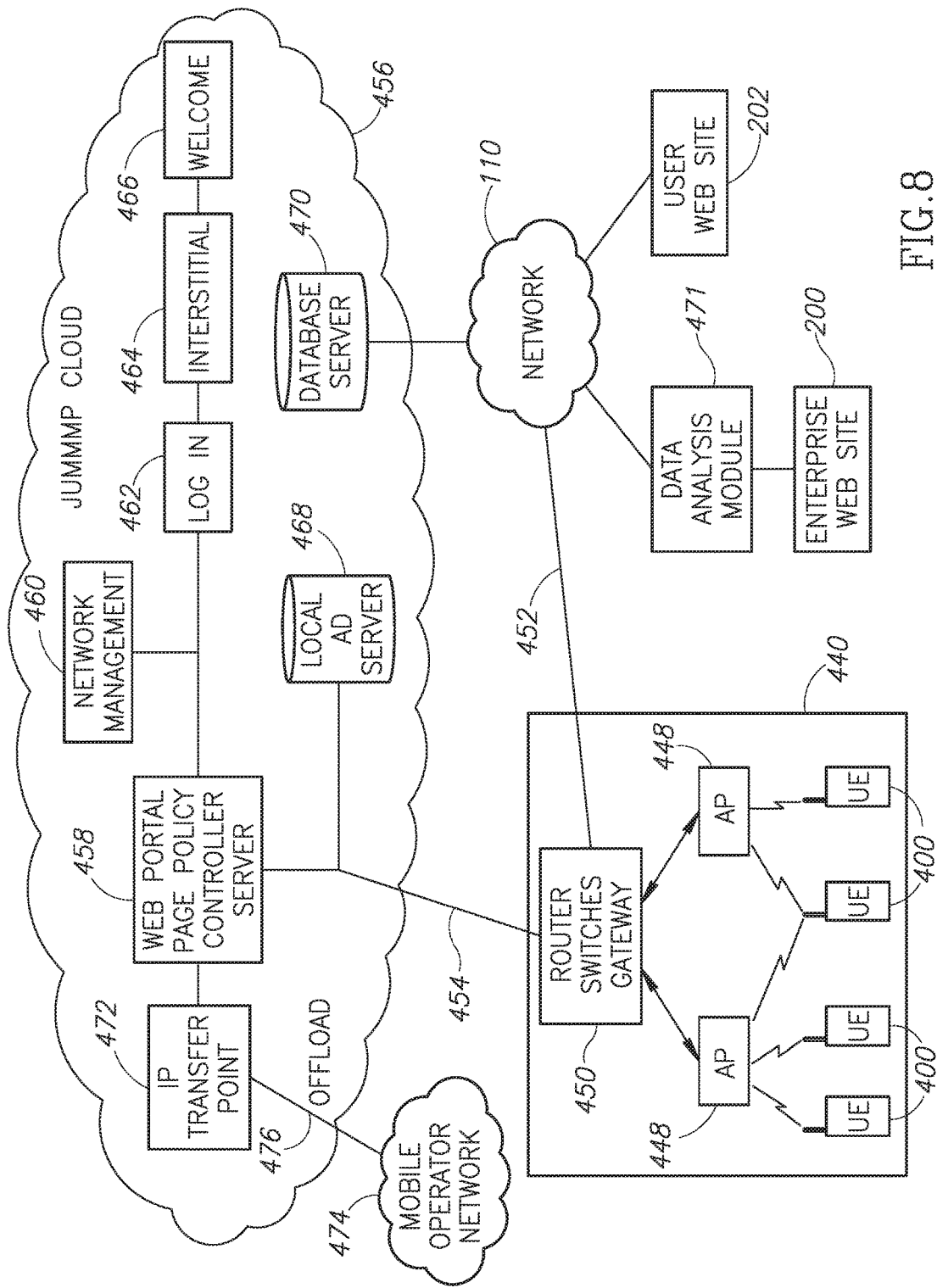
FIG. 8 illustrates a system architecture in which a venue communicates with a Cloud network.

In the embodiment of FIG. 5, all of the APs 448 may be coupled to a routing infrastructure 502 (see FIG. 10) or a gateway 450 (see FIG. 8). As the UE 400 moves throughout the venue 440, it is making and breaking connections between the UE 400 and one or more of the APs 448. Even though the UE 400 is making and breaking connections between specific ones of the APs 448, the UE maintains a continuous communication link with the venue 440 via the APs so long as the UE is within range of at least one AP. The API is a software program that aids in the authentication of the UE 400 and further facilitates communication between the UE 400 and the venue 440. The API also facilitates the exchange of Direct Messages, Group Messages, and Public Messages between UEs and between the UE and an AP (e.g., one of the APs 448 in FIG. 5).

The UE 400 must perform an initial registration at some point in time. The registration process will be discussed in greater detail below. Following the initial registration process, the UE 400 can be automatically authenticated when it enters the venue 440. The authentication process will also be described in greater detail below. Once the identity of the UE 400 has been authenticated, the server 458 (see FIG. 8) can provide customized messages to the owner of the UE 400. While the UE 400 remains within the venue 440, it is in substantially continuous contact with the APs 448 and may receive data therefrom.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown).

FIG. 8 illustrates a system architecture that allows operation of the system across multiple venues. In FIG. 5, the venue 440 is illustrated with a limited number of UEs 400 and a limited number of APs 448. As discussed above with respect to FIG. 5, the venue 440 may have a large number of APs 448 distributed throughout the venue. The various APs are coupled together using routers, switches, and the like. Those routers, switches and gateways are illustrated in FIG. 8 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 8 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 8 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, options for different Internet bandwidths, a voucher code entry page to permit the user to enter discount voucher data, and the like.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 5). In addition, the ads may be for businesses near the venue 440 (or for other venues in the JUMMMP network). Although the ad server 468 may be located within each venue 440, the centralized ad server 468 in the JUMMMP Cloud 456 simplifies the network architecture within the venue 440 and other venues by eliminating the need for an ad server within each venue.

A database server 470 in the JUMMMP Cloud 456 may be configured to collect a broad range of information regarding the UEs 400 (including the user profile information from the data storage area 184 (see FIG. 2) that was provided when the UE was first registered with JUMMP Cloud 456 and/or when the UE is authenticated in the venue 440. In addition, the database server 470 can provide time and location data, UE information, and the like, that are obtained from the UE 400 via the heartbeat signal. The profile information will help provide targeting marketing and advertising to the UE 400 as it traverses the venue 440).

The data collected by the database server 470 can be analyzed using data analysis module 471, which can analyze raw data using data analytics and/or data mining. Those skilled in the art will appreciate that data analytics is the science of examining raw data to draw conclusions about the information. Data mining is a known process to identify undiscovered patterns in raw data to establish relationships based on the data. In the present context, the data analytics and/or data mining are used to analyze the movement patterns, shopping patterns, text messaging patterns, and the like. The data analytics and/or data mining can be used in conjunction with user-provided profile data to thereby establish a sophisticated user profile for individual users, groups of users, or the general public. The data analysis module 471 can operate in conjunction with data from the database server 470, or provided to a third party for analysis. In an exemplary embodiment, the resultant user profiles can be stored within the database server 470 and subsequently employed to provide customized targeted advertising to the owner of each EU 400. The results of the data analysis are used to provide targeted personal ads to the UE 400 from the local ad server 468.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi APs in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 8, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 8 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue.

When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP offloading provided by the JUMMMP Cloud 456.

In the embodiment of FIG. 8, the policy controller server 458 may function as an authentication server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must perform an initial registration with the system 100 at some point in time. The initial registration can be performed remotely using, by way of example, a laptop or PC connected to the JUMMMP Cloud 456 via the network 110. In another variation, the UE can perform an initial registration as it enters the venue 440 illustrated in FIG. 8, as described above. When the UE 400 initially contacts any of the APs 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (e.g., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 458. In another alternative embodiment, a unique hash of one or more device IDs may be generated and transmitted to the registration server 458 as the device ID. The short-range transceiver 176 (see FIG. 2) may also include an identification, such as a MAC address that is unique to the UE 400. The registration data described above can be provided to the registration server 458 along with the MAC address. The registration data may be stored in association with the MAC address.

As part of the registration process, an application program interface (API) is downloaded and installed on the UE 400. As discussed above, the API provides the communication functionality to the UE 400. Alternatively, or in addition to the API, the venue 440 may download an application program to the UE 400. The application program may be stored locally within the venue 440 or downloaded from the JUMMMP Cloud 456. In yet another alternative, the venue 440 may provide a mechanism, through the registration process, for the UE 400 to download and install the API from a certified official store, such as the Apple Store or the Android APP Store. The application program may be unique to the individual venue or a general application program applicable across multiple venues. In an exemplary embodiment, the application software may start whenever the UE 400 turned on and runs in the background as a service in a manner similar to the API discussed above. In a manner similar to the API, the application software may be configured to send periodic heartbeat signals with location information and unique identification information to the database server 470. In return, the venue can present promotional information to the UE 400 based on the current location, the user profile, or other factors, as will be described in greater detail below.

If the short-range transceiver 176 (see FIG. 2) is not turned on, the software application program, or the API, will turn on the short-range transceiver. In an exemplary embodiment, the user may decide to turn off the short-range transceiver 176. In this case, the API or the application software program will leave the short-range transceiver 176 in the disabled state so as to avoid unnecessary or unwanted transmissions to the UE 400. However, if the user re-enables the short-range transceiver 176 or restarts the software application program, the short-range transceiver 176 will be automatically enabled.

Once the initial registration process is completed, the web portal page server 458 may transmit other pages, such as the log-in web page 462, one or more interstitial web pages 464, and the welcome web page 466 shown in FIG. 8.

The UE 400 can also perform the initial registration using a conventional wireless service provider network. As previously discussed the UE 400 can communicate with the PLMN 102 (see FIG. 1) in a conventional manner. Those skilled in the art will appreciate that the UE 400 can access the network 110 via the PLMN 102. Conventional wireless service provider components, such as the gateway 108 to the network 110 are known in the art, and need not be described in greater detail herein. In one embodiment, the UE 400 can perform a registration process with the registration server 458 (see FIG. 8) via the RAN 102. In this embodiment, the UE 400 accesses the JUMMMP Cloud 456 or a website, such as the JUMMMP network website 200 illustrated in FIG. 3. In this example, the registration server 458 may be associated with the JUMMMP network website 200 (see FIG. 3) or the JUMMMP Cloud 456 of FIG. 8. In either case, the user provides the information described above, such as the telephone ID, device ID, user ID, email address, MAC address, name, and the like. In addition, the user can provide profile data, such as described above.

Alternatively, the UE 400 may perform an initial registration using a conventional computer (e.g., the user computing device 112 of FIG. 1) to provide the registration data for the UE 400 to the policy controller server 458 or registration server 460 via the network 110. The user can simply send a registration request message to the policy controller server 458 and provide user information, such as user profile information, the telephone ID, User ID, and device ID associated with the UE 400. The policy controller server 458 can store the authentication information in the database server 470.

In an exemplary embodiment, a previously-registered UE 400 may come within range of any of the APs 448 in the venue 440 of FIG. 8 and establish a wireless communication link therewith. The venue 400 will automatically authenticate the UE 400 based on previously stored registration information associated with the UE. This can be accomplished by comparing the UE data to the data stored on the database server 470.

Figure 9:
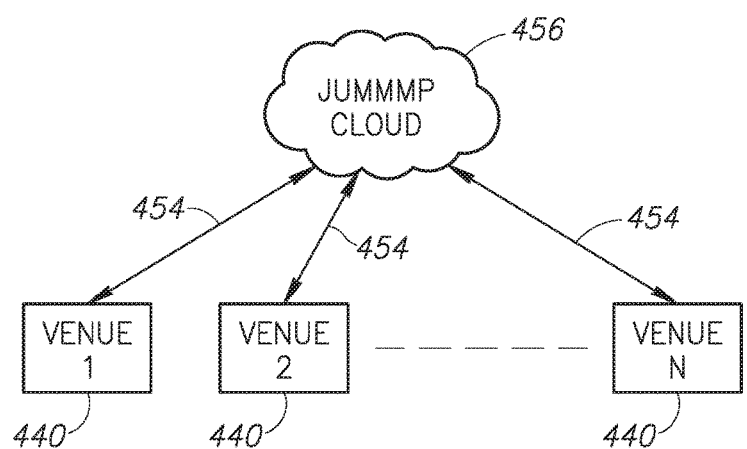
FIG. 9 illustrates the Cloud network of FIG. 8 communicating with multiple venues.

The registration process at a single venue has been discussed above with respect to FIG. 5. The JUMMMP Cloud 456 also advantageously provides a centralized registration function for multiple venues, as illustrated in FIG. 9. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 9, the UE 400 will automatically identify the AP 448 in the Venue 2 as part of a JUMMMP network and begin to communicate therewith. In establishing the communication link, the UE 400 transmits its MAC address and/or other forms of identification, such as the phone ID or IMEI, the device ID, the user ID or the like, either alone or in combination. The AP 448 transmits an authentication request message to the registration server 458 to determine whether the UE 400 is a registered device. Based on the MAC address or other device identification data, the registration server 458 can confirm that the UE 400 has previously registered.

Because the UE 400 has already been registered, that information is passed along to the JUMMMP Cloud and the UE 400 is automatically authenticated for its new current location. This may occur transparently to the user. This automatic authentication process can occur even if the initial registration was in a completely different part of the country. The UE 400 may move from one venue 440 to another in the same city or region or may be in a completely different part of the country and be automatically identified and authenticated with APs that are part of the JUMMMP network. This convenient registration and authentication avoids the need for constantly searching for a WiFi connection as required by other systems. Based on this automatic authentication process, the UE 400 may be automatically connected to the WiFi network created by the APs 448 in the venue 440. The UE 400 may get welcome greetings from the venue 440 and may also receive advertising, offers, discounts, and the like from the present venue or other venues connected to the JUMMMP Cloud 456 (see FIG. 9). Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400. Thus, even though the venues 1-N may be separate entities in completely different locations, they may all be considered part of a JUMMMP network because they are all coupled to the JUMMMP Cloud 456 and rely on the capabilities of the JUMMMP Cloud for at least the registration and authentication purposes. Furthermore, as described above, the venues may rely on the JUMMMP Cloud 456 to generate targeted advertising for the UE 400 based on the profile information, user location information, and the like.

Figure 10:
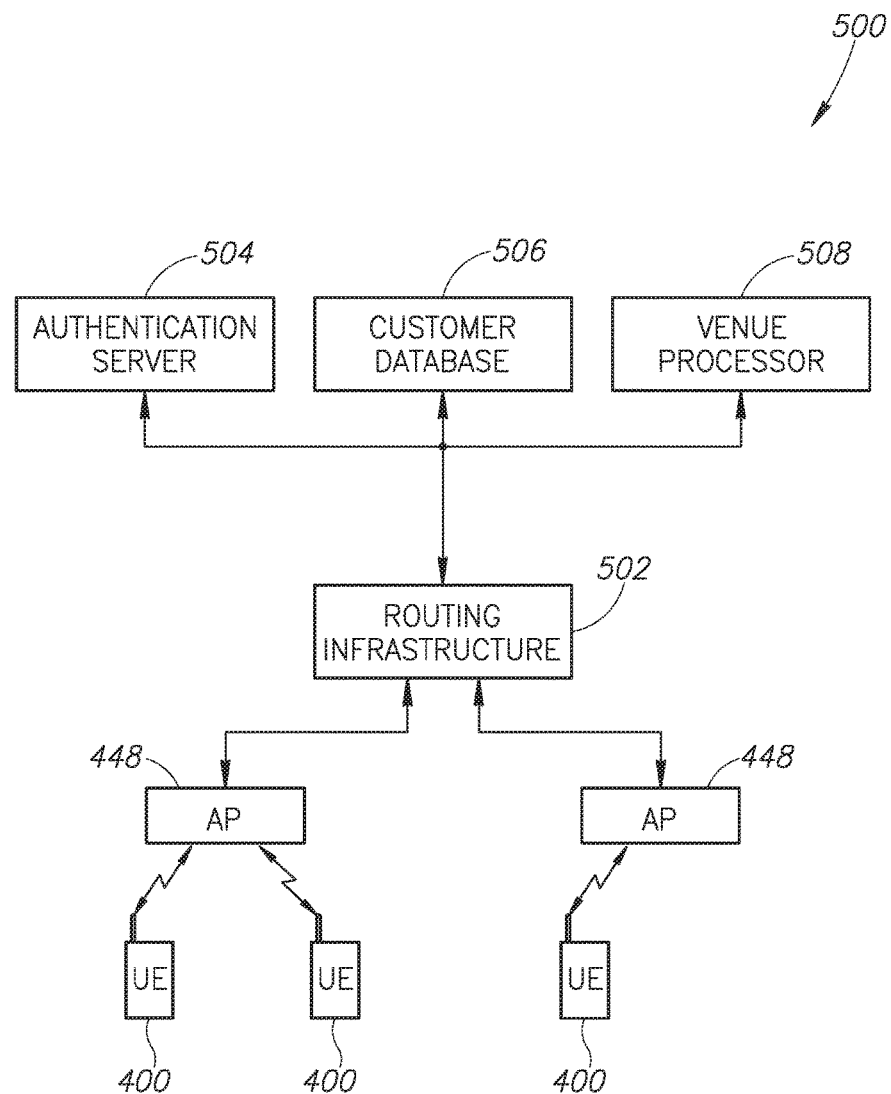
FIG. 10 is a functional block diagram of a system to implement using wireless communication devices in a retail shopping venue.

FIG. 10 illustrates a functional block diagram of a system 500 that can be implemented within the venue 440 (see FIG. 5) for retail shopping using the UE 400. In the example of FIG. 10, the UEs 400 are connected to ones of the APs 448. Those skilled in the art will appreciate that the UE 400 will communicate with one or more of the APs 448 based on signal characteristics, such as signal strength, data error rates, and the like. As will be described in greater detail below, the UEs 400 participating in a particular game do not have to be connected to the same AP 448.

The plurality of APs 448 are coupled to a routing infrastructure 502. Like the router, switches, gateway 450 in FIG. 8, the routing infrastructure 502 comprises routers, switches, gateways, firewalls, and the like. The implementation of the routing infrastructure 502 in connecting a plurality of the APs 448 is within the scope of knowledge of ordinary skill in the art and need not be described in greater detail herein.

The routing infrastructure 502 couples the APs 448 to an authentication server 504, a customer database 506, and a venue processor 508. The venue processor 508 may be a conventional computer system. In an exemplary embodiment, the customer database 506 may be implemented as part of the venue processor 508. The authentication server 504 and customer database 506 have functionality similar to that of the policy controller server 458 and the database server 470, respectively, in FIG. 8. Alternatively, the policy controller server 458 and database server 470 in the JUMMMP Cloud 456 may be used. As can be appreciated, it is important to authenticate each UE 400 present in the retail department store venue 440. The authentication process has already been discussed in detail above with respect to FIGS. 8-9. In one embodiment, the initial registration and authentication can occur when the UE 400 first enters the venue 440. This process is described above. Furthermore, if the UE 400 was previously registered, even at a different venue, such as the Venue 2 in FIG. 9, the UE 400 can be automatically authenticated when the user enters the venue 440 if the authentication process occurs in the JUMMMP Cloud 456. Thus, the authentication server 504 may be a local server within the venue 440 (see FIG. 10) or may be part of the JUMMMP Cloud 456. As discussed above, the web portal page policy controller server 458 can function as the authentication server in the JUMMMP Cloud 456. The web portal page server 458 controls the display of log-in web pages 462, interstitial web pages 464, and welcome web pages 466, as described above in the implementations shown in FIGS. 8-10.

In one configuration, the API, which is installed on the UE 400 as part of the verification process described above, is configured to generate a "heartbeat" signal that periodically reports location data back to the database server 470. The location data may include a time/date stamp to provide location information for the UE 400. This information can be useful for marketing purposes in any of the implementations shown in FIGS. 8-10.

Those skilled in the art will appreciate that the term "hot spot" may typically refer to the access point 140. However, in the present embodiment, a hot spot refers to any wireless device (e.g. the access point 140 or any wireless communication device) that is configured to broadcast a beacon signal identifying the device as available for communication with other wireless communication devices. In the example described above, a wireless hot spot is configured to transmit a beacon signal containing the SSID "JUMMMP." In this exemplary embodiment, the wireless communication device searches for a hot spot transmitting the SSID "JUMMMP."

Figure 13:
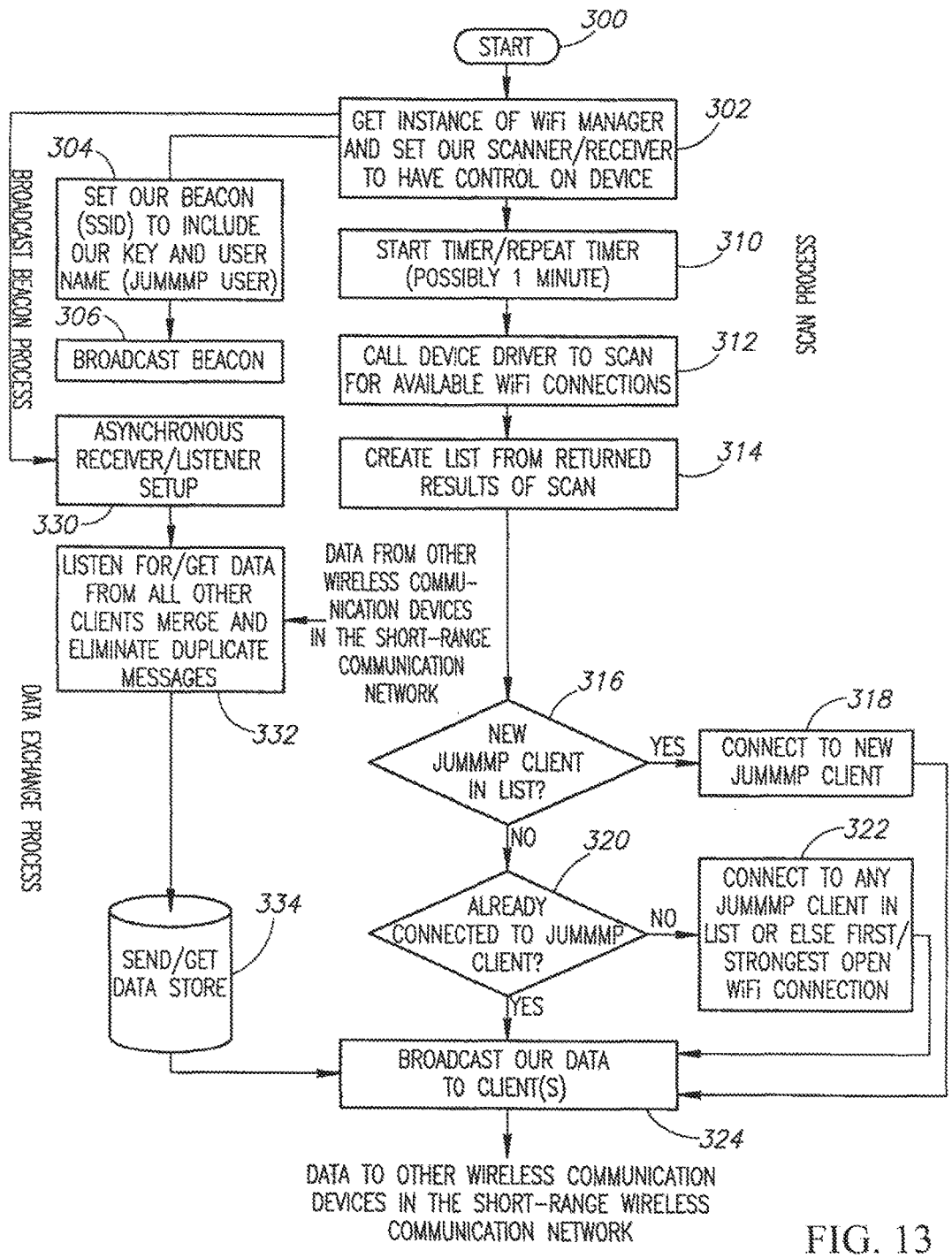
FIG. 13 is a flow chart illustrating the operation of an application program interface to implement the short-range wireless communication network.

FIG. 13 illustrates a flow chart and functionality of an application program interface (API) utilized by jump-enabled wireless communication devices. The JUMMMP API may be programmed into the wireless communication device at the time of manufacture or downloaded in a conventional manner. The JUMMMP allows a wireless communication device with a short-range transceiver 176 (see FIG. 2) to function as a jump-enabled device. Those skilled in the art will understand the programming steps to download and install the JUMMMP API. The controller 182 (see FIG. 2) in the wireless communication device (i.e., the wireless communication device 120) executed the JUMMMP API. As previously noted, the controller 182 may be implemented as a set of instructions stored in the memory 152 and executed by the CPU 150.

At a start 300, shown in FIG. 13, the JUMMMP API is already present within the various wireless communication devices. FIG. 13 illustrates a number of processes that are performed by the JUMMMP API, including a Broadcast Beacon Process, a Scan Process, and a Data Exchange Process. The separate processes may be executed repeatedly by the wireless communication device.

At step 302, the wireless communication device enables an instance of a WiFi Manager that controls the WiFi communication hardware (i.e., the short-range transceiver 176 of FIG. 2) and sets the JUMMMP API to have control of the short-range transceiver. The three processes listed above all require the operation of step 302 such that the JUMMMP API gains control of the short-range transceiver 176. Any wireless communication device that includes a WiFi transceiver will include some control functionality, labeled herein as the WiFi Manager to control the WiFi communication transceivers using one or more software drivers that control the actual hardware. With the installation of the JUMMMP API, the wireless communication device 120 may hook into the existing WiFi Manager and utilize some of the WiFi Manager functionality. Certain functions, such as the Scan Process, may be controlled to a greater degree by the JUMMMP API.

The Broadcast Beacon Process is initiated to inform wireless devices of the presence of a jump-enabled wireless communication device. In step 304, the beacon signal of the jump-enabled wireless communication device is altered such that the SSID will contain a key word identifying the wireless communication device as part of a jump network (e.g., SSID=JUMMMPNet). Those skilled in the art will appreciate that IEEE802.11 provides for user-specified data to be broadcast as part of the beacon signal. In a current implementation of IEEE802.11, a total of 32 characters are available for user-defined purposes. In step 304, the beacon signal is also altered to include a local user name and may, optionally, include a unique alphanumeric identifier and additional flags that may be used for applications utilizing the JUMMMP API. Application programs can use the JUMMMP API to insert application-specific data into the beacon signal. For example, a social networking application program can use the JUMMMP API to insert information such as age, sex, and interests of the user that will be broadcast in the beacon signal and used by other wireless communication devices running the social networking application program. In another example, a sports application program can insert sports scores or updates into the beacon signal. If there are too many scores to fit into the allocated space in a single beacon signal, the scores can be changed with each beacon signal.

In step 306, the wireless communication device 120 periodically transmits the beacon signal. The beacon signal may be set to broadcast continuously or at a predetermined interval, such as, by way of example, every ten seconds. Those skilled in the art will appreciate that the interval used to broadcast the beacon signal may be altered based on system metrics. The beacon broadcast process ends at step 306 with the short-range transceiver 176 continuing to broadcast the beacon signal.

While the jump-enabled wireless communication device 120 is broadcasting its own beacon signal, it also listens for the beacon signals broadcast from other jump-enabled wireless communication devices (e.g., the wireless communication device 122). The Scan Process illustrated in FIG. 13 outlines the actions of the JUMMMP API to detect and communicate with other jump-enabled devices. In the Scan Process, illustrated in FIG. 13, a timer is started in step 310. As discussed above, step 302 has already been performed to permit the JUMMMP API to gain control of the WiFi Manager. The timer process in step 310 determines how frequently a jump-enabled wireless communication device 120 will scan for other jump-enabled wireless communication devices.

In step 312, the JUMMMP API controls the WiFi Manager to activate a device driver in the wireless communication device to scan for available WiFi connections. In step 314, the jump-enabled wireless communication device creates a list of results returned from the scan in step 312. The list of results may be stored in the data storage area 184 (see FIG. 2). It should be noted that this list may include non-jump-enabled wireless communication devices as well as jump-enabled wireless communication devices.

In decision 316, the controller 182 (see FIG. 2) in the jump-enabled wireless communication device 120 determines whether any new jump-enabled wireless communication devices are present on the list. Those skilled in the art will appreciate that the wireless communication device performing the scan process may be designated as the group owner while any detected wireless communication devices (whether or not they are jump-enabled devices) may be designated as client devices. As previously discussed, in many WiFi modes of operation, one wireless device must be designated as the group owner while others of the wireless communication devices are designated as client devices. Those skilled in the art will appreciate that the Scan Process (see FIG. 13) is not limited only to the group owner. In an exemplary embodiment, all jump-enabled wireless communication devices perform a Scan Process in an effort to discover and connect with other wireless communication devices. Furthermore, while there may be a preference to connect with other jump-enable wireless communication devices, the Scan Process will discover any nearby wireless communication device, whether or not it is jump-enabled, and may connect to any nearby wireless communication device, whether or not it is jump-enabled.

If there are new jump-enabled wireless communication devices in the list, the result of decision 316 is YES and, in step 318, the wireless communication device 120 connects to the new jump client device.

If there are no new jump devices detected as a result of the scan in step 312, the result of decision 316 is NO and, in decision 320, the wireless communication device 120 determines whether it is already connected to another jump-enabled client device. If the wireless communication device is not already connected to a jump-enabled client device, the result of decision is NO and, in step 322, the jump-enabled wireless communication device will attempt to connect to any jump client device in the list (created in step 314) or else attempt to establish a connection with the first open WiFi connection from the list created in step 314. Alternatively, the jump-enabled wireless communication device may attempt to connect to the open WiFi connection having the strongest signal in step 322.

If the wireless communication device is already connected to a jump client, the result of decision 320 is YES. If the wireless communication device has connected to a new jump client in step 318, or connected to a WiFi device in step 322, or is already connected to a jump client device from decision 320, the wireless communication device 120 broadcasts stored data to any client device(s) to which it is able to connect in step 324. As will be described in greater detail below, the system 100 is capable of distributing messages throughout a short-range communication network 116 and may even distribute messages from one short-range communication network to another.

FIG. 13 also illustrates a message exchange process to facilitate the exchange of data between wireless communication devices in a particular short-range communication network 116 (e.g., the short-range wireless communication device 116e of FIG. 4). The data exchange process in the JUMMMP API is also illustrated in FIG. 13. As with other processes illustrated in FIG. 13, the JUMMMP API begins with step 302 in which the WiFi manager is instantiated and the controller 182 (see FIG. 2) has control of the short-range transceiver 176. In step 330, the controller 182 configures the short-range receiver 174 to detect transmitted beacon signals from other jump-enabled wireless communication devices. The wireless communication device 120 has stored messages previously received from other clients and stored the received messages in the data storage area 184 (see FIG. 2). In step 332, the wireless communication device listens for and gets data from all other jump-enabled clients. In step 332, the controller 182 also merges the messages received from other clients in step 332 and stored in the data storage area 184 as well as newly received messages in order to merge the messages and eliminate duplicate messages. In this manner, the wireless communication device manages the message data within the data storage area 184. Further details of message management will be provided below.

In step 334 the controller 182 stores the merged message data in the data storage area 184 and in step 324, the merged message data is broadcast to other clients' jump-enabled wireless communication devices that form part of the short-range communication network 116. Thus, when two jump-enabled wireless communication devices detect each other and form a short-range communication network 116, the wireless communication devices exchange message data with each other such that the message data is synchronized between the two devices. If a third wireless communication device joins the short-range communication network 116, its message data is exchanged between the two wireless communication devices that have already formed the network. Thus, the wireless communication devices within a particular short-range communication network 116 are effectively synchronized with the respective message data.

As previously mentioned, data messages may include geo-location data. The geo-location data (e.g., longitude and latitude) can be obtained in several possible ways. In one embodiment, the UE (e.g., the UE 400 in FIG. 8) may have built-in GPS. Other possible location determination technologies include WiFi, 3G, approximation triangulation, or last-known location of the user. Other known location technologies may also be implemented in the system 100. For example, the UE 400 will communicate with different ones of the AP 448 in the venue 440 shown in FIG. 5. As the UE 400 moves throughout the venue, new communication links are established with nearby APs 448. By identifying which AP 448 the UE 400 is communicating with, it is possible to determine the location of the UE 400 with a reasonable degree of accuracy.

In an exemplary embodiment, the API in the UE 400 is configured to do a periodic scan such that the UE can scan and record each of the SSIDs and hidden SSIDs (i.e., a BSSID) within range of the UE. For example, the UE 400 can do a WiFi scan every 60 seconds and report the location information to the database server 470 along with the heartbeat signal. In an exemplary embodiment, the UE 400 can sort the APs by signal strength. The data is reported back to the UE 400 by any of the APs 448. Using this information, the venue 440 can determine which AP 448 is closest to the UE 400. For greater accuracy, the various APs 448 can each measure the signal strength of the UE 400 and use the relative signal strength measurements to perform a form of triangulation to determine the precise location of the UE 400. In this manner, the venue 440 can determine the precise location of the UE 400 in a particular location, such as the department, within the venue 440.

Figures 6, 7:
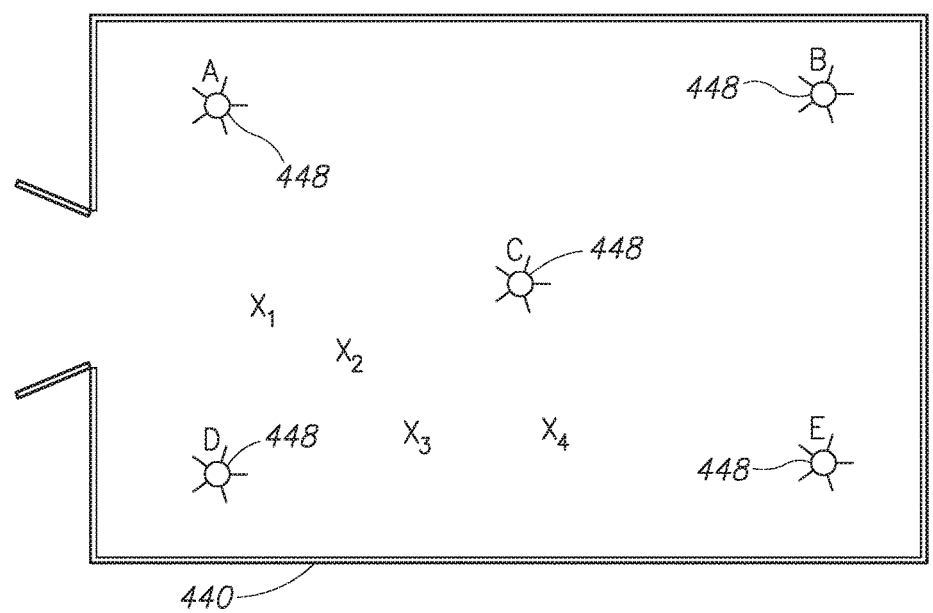
FIG. 6 illustrates a sample data table of signal strength measurements to determine location of a user equipment.
FIG. 7 illustrates the use of the data in the table of FIG. 6 to determine the location of a user equipment within a venue.

Although the venue 440 can dynamically perform triangulation measurements in the manner described above, those skilled in the art will appreciate that such calculations can be cumbersome and time consuming, particularly is the venue has a large number of UEs 400. In an alternative approach, the venue may employ a data table, such as illustrated In FIG. 6, that will simply provide the location of the UE 400 based on the signal strength measurements from various APs throughout the venue 440. In an exemplary embodiment, data for the data table in FIG. 6 can be obtained in advance by measurement device. For example, as illustrated in FIG. 7, the venue 440 has five APs 448 designated in FIG. 7 as A-E. In this example, the test measurement device may simply be a UE 400 that is configured to constantly measure the signal strength from the various APs 448 and to report those measurements back as the UE 400 moves throughout the venue 440. That is, the UE 400 is simply placed in a measurement mode and carried throughout the venue 440. For example, the UE 400 in the test measurement mode can walk down every aisle in a retail venue, using a map of the venue to identify the specific location of the test measurement UE. The UE may move from one department to another, or from one store to another if the venue 440 is, by way of example, a shopping mall. In some cases, the UE 400 in the test measurement mode may move from one level to another (e.g., using an escalator) to move among departments in the shopping venue 440.

In the example illustrated in FIG. 7, the UE 400 in the test measurement mode is moved from location $X_1$ to $X_4$, such as might be common moving down an aisle in a retail venue. At each of the locations $X_1$-$X_4$ the UE 400 in the test measurement mode measures the relative signal strength of each of the APs A-E. The system described herein may use continuous measurements from the UE 400 or take sample measurements at incremental distances from a prior measurement location. For example, the distance between locations $X_1$ and $X_2$ in FIG. 7 may be, by way of example, 10 feet. In this manner, the data table of FIG. 6 can be populated with signal strength measurements derived from the UE 400 in the test measurement mode. Those skilled in the art will appreciate that the UE 400 may not receive any signal from a particular AP 448 if the signal strength is too low. In the table of FIG. 6, the UE 400 in the test measurement mode detects a signal from the APs A, C and D. No signal was detected from the APs B and E. At location $X_2$, the UE 400 in the test measurement mode detects different signal strengths from multiple ones of the APs A-E.

As the UE 400 in the test measurement mode moves throughout the venue 440, the data in FIG. 6 provides detailed measurements of relative signal strengths at each location throughout the venue 440. In operation, the UE 400 performs the same type of measurements described above with respect to a device in the test measurement mode. However, when it reports its signal strength data, the signal strength measurements can be compared to the data in FIG. 6 to determine, for example, if the user is at approximately the location $X_3$, the signal strength measurements returned by the UE 400 will approximately match those values in the Table of FIG. 6.

With this data, the venue 440 can accurately track the movements of the UE 400 throughout the venue. In addition, the venue 440 can provide navigational directions throughout the venue. For example, if the consumer is in one department within the venue and wishes to move to a different department (or store), the accurate location information provided by the table in FIG. 6 allows the movement of the user to be tracked throughout the venue. At an appropriate place, a text message or other Indicator (e.g., turn right in 15 feet) can be sent to the UE 400 to guide them to the desired destination. Those skilled in the art will appreciate that the example table of FIG. 6 may be conveniently stored within the venue 440 itself, or stored on the JUMMMP cloud 456 (see FIG. 8). For example, the venue processor 508 (see FIG. 10) can store the data table of FIG. 6 and determine a current location for the UE 400 within the venue 440.

In addition to the navigational aids described above, the system 100 can utilize the measured and calibrated signal strength data to provide a map of the venue 440 on the display 154 (see FIG. 2) of the UE 400 with a "You Are Here" indication to show the current location of the UE 400 within the venue. It can also provide directions from point A to point B. Furthermore, it can provide visual designators, such as a bubble, for various departments in the venue 440 to indicate to the shopper that targeted advertising is available in association with each bubble. The bubble serves as a "pull" notification to the UE 400 similar to pull notifications that are requested whenever the heartbeat signal is transmitted. Using this type of advertising encourages shoppers to engage and request an advertisement and, is resultantly less intrusive than push advertising or push advertising notifications.

The database server 470 is configured to store the location data, along with time/date data to thereby track movements of the UE 400. In one embodiment, the database server 470 can also be configured to store message data from the UEs 400 throughout the system 100. Using the example of FIG. 5, where the department store venue 440 includes a large area as well as related businesses 442-446, the database server 470 can determine how long the UE 400 remains in a particular area (e.g., one department of the department store), how many times and how long the UE remains in a department, in a restaurant, or the like or in any venue 440 associated with the JUMMMP Cloud 456 (see FIG. 8). By collecting this information, the database server 470 can establish a user profile for the UE 400 for marketing purposes. In yet another embodiment, the database server 470 may also store user profiles for the UE 400 as well as profile data collected by the UE 400 from other JUMMMP users.

The customer database 506 may store information related to the owner of the UE 400 with respect to interactions in the department store venue 440, including, but not limited to, purchases, shopping preferences, virtual store credits, debit card information, credit card information, and the like. Alternatively, the customer database 506 may temporarily store data and periodically upload the data to the database server 470 (see FIG. 8) in the JUMMMP Cloud 456. The database server 470 in the JUMMMP Cloud 456 allows the aggregation of customer profile information across multiple venues and thus may provide a more extensive profile for the user of the UE 400.

The system 100 operates in a retail facility, such as a department store or shopping mall, to monitor the user's movement throughout the department store and thereby generate potential marketing information that will allow customized and targeted advertising for each user. For example, the system can track one UE 400 and determine that the user spent 45 minutes in the women's shoe department followed by 20 minutes in the women's clothing department. Meanwhile, another UE 400 in the same department store venue 440 may have movements tracked through the athletic equipment department and the video/music department of the same department store venue 440. User tracking information is reported periodically to the customer database 506. Based on this information alone, the customer database 506 (or the database server 470 in the JUMMMP Cloud 456 implementation illustrated in FIG. 8) can deduce shopping patterns for the owners of each of the UEs 400. In some implementations, information in the customer database 506 (or database server 470 in FIG. 8) may utilize data analytics, such as provided by the data analysis module 471 in FIG. 8 or similar functionality associated with the customer database 506 in FIG. 10. In addition, the customer database 506 may also be provided with information regarding purchases made by any of the users. In addition, the users themselves may have provided profile information from the data storage area 184 (see FIG. 2) of the UE 400 when the UE initially entered the department store venue 440. The information may be provided directly from the UE 400 to one of the APs 448 when the UE enters the store and a prior registration is used to authenticate the UE 400. In yet another alternative embodiment, profile information and other information relating to the UE may be stored in the database server 470 (see FIG. 8) on the JUMMMP Cloud 456. The database server 470 may provide extensive marketing information regarding the UE 400 both in the department store venue 440 and in other venues to permit the construction of a sophisticated marketing profile for the owner of the UE 400.

With the combination of user-provided profile information and venue tracking information automatically collected, the database server 470 can generate a sophisticated marketing profile for users. Even when a user does not provide any profile information, the data automatically collected as the customer moves through the department store venue 440 can be used to establish a sophisticated profile that is associated with a unique individual, even if the individual is not personally identified. That is, it is possible to establish a profile associated with a particular UE 400 without knowing the actual identity (e.g., the profile of Mr. Smith). Information for a particular UE 400 can be collected during multiple visits to the department store venue 440 to further refine the user profile in the customer database 506 (or database server 470 in the JUMMMP Cloud 456). Although the actual identity of the user may not be known, the movement of the UEs 400 throughout the store or venue 440 provide an additional source of information that can be used for further marketing applications.

As noted above, the user may download a software application program to be used in conjunction with the department store venue 440. The software application permits the user to provide additional profile information. The information can be personal information (name, age, sex, education, hobbies, interests, etc.), as well as shopping preferences (clothing style, preferred designers, manufacturers, sizes, color preferences, price ranges for certain goods, etc.), and the like. This user-provided profile information, in addition to the heartbeat location data and purchase date described above, will be used to enhance the targeted advertising to the customer.

The advertising that the customer receives while in the department store venue 440 can be of any form, including, but not limited to video data, audio data, interstitial advertisements, website data, website links, text data, image data, coupon data, bar code data, QR data, or any other possible type of advertising. In one embodiment, the software application operating on the UE 400 may be able to pull advertising from the customer database 506 (or local ad server 468 in the JUMMMP Cloud 456 in FIG. 8). For example, the user of the UE 400 may be interested in certain items within the department store venue 440 and can inquire about sales for the items of interest. Thus, sale information in any form, such as those listed above, are provided to the UE 400 based on the user-initiated inquiry. In addition, when the heartbeat signal is sent to the customer database 506 (or the database server 470 in FIG. 8), an application program or the API on the UE 400 can request any available advertisements for the UE, thus "pulling" ads from an ad server, such as the local ad server 468 in FIG. 8.

Alternatively, the department store venue 440 can push the same range of advertising data to the UE 400. For example, the store venue 440 can provide advertising data, such as that described above, to the UE 400 based on factors such as the user profile, the present location of the UE 400 within the store, amount of time that the UE has spent in selected departments within the store, or the like, taken singly or in combination.

Any data collected and sent to the database server 470 in the JUMMMP Cloud 456 can be processed offline using data analytics and/or data mining provided by the data analysis module 471 (see FIG. 8) to process the data and provide useful information for the department store venue advertising group to effectively target individual advertising to the consumer, to a group of consumers, or the general public based on the data analysis.

In short, the database server 470, operating in conjunction with the application software, will be able to know who the shopper is, where the shopper is in the store, how long they have been in the store, how long they have been in each department of the store, and what they bought. Resultantly, the department store venue 440 can push the customer deals to the UE 400 based on their location in the store and on their shopping history. If the customer has downloaded and installed the software application program on the UE 400, they will receive better offers than those customers who do not have the software application on their UE and will receive email offers instead.

In addition, the venue processor 508 may host a secure website to provide digital wallet functionality. As will be described in greater detail below, the secure website is simply the POS website for the venue 440. A communication shell provides a gateway to the secure POS website.

Figure 11:
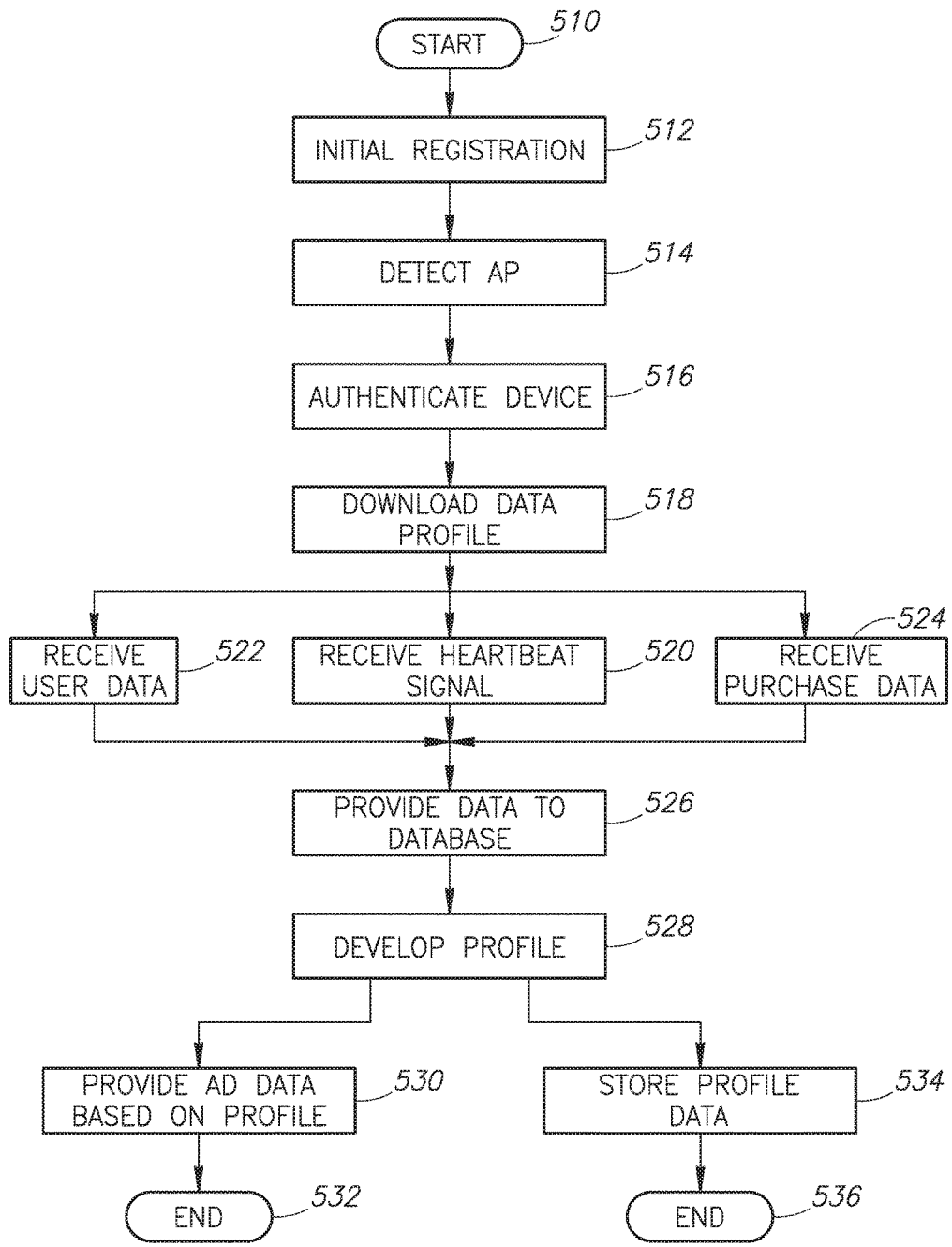
FIG. 11 is a flow chart illustrating the operation of the system of FIG. 10.

FIG. 11 is a flow chart illustrating the operation of an exemplary embodiment of the system 500. At a start 510, the venue 440 has one or more APs 448 within the venue. At step 512, the UE 400 performs an initial registration. Various techniques for performing the initial registration have been described above. As part of the initial registration process, the API and/or application software program are downloaded to the UE 400. As noted above, the initial registration process need only occur a single time. In an exemplary embodiment, the initial registration data is provided to the database server 470 (see FIG. 8) in the JUMMMP Cloud 456.

Following the initial registration, the UE 400 detects the presence of one of the APs 448 in the venue 440. Upon detection, the UE 400 automatically provides identification data to the AP 448 in the manner described above. At step 516, the system 500 can automatically authenticate the UE 400. This may be done locally using the authentication server 504 in the venue 440 itself. Alternatively, if the venue 440 is part of the JUMMMP network, as described above, the authentication may occur using the authentication server 458 in the JUMMMP Cloud 456.

Upon authentication, the user profile for the UE 400 is downloaded in step 518. If the venue 440 is part of the JUMMMP network, the profile is downloaded from the database server 470. Alternatively, if the system 500 is a standalone system within the venue 440, the profile may already be present in the customer database 506 as the result of prior interaction between the UE 400 and the venue 500. In yet another alternative embodiment, the venue 500 may communicate with and be functionally connected with the JUMMMP Cloud 456 in FIG. 8. In this embodiment, customer information may be stored in the database server 470 and downloaded to the customer database 506 as soon as the UE 400 is detected within the venue 500.

Once the UE is within the venue, it will periodically transmit a heartbeat signal in the manner described above. In step 520, one or more of the APs 448 receive the periodic heartbeat signal. As described above, the heartbeat signal can be sent at convenient time intervals, such as 30 seconds, 60 seconds, 90 seconds, etc. The heartbeat signal includes location information, and may also include user profile information stored within the data storage area 184 (see FIG. 2) of the UE 400.

In addition to the heartbeat signal, the APs 448 may receive text data in step 522. These text messages are associated with the social network aspect of the system, as previously described. Those skilled in the art will appreciate that text data can be sent at will by the user of the UE 400 and need not wait until the heartbeat signal. That is, manual transmission of text messages by the user and the heartbeat signal are independent processes. The heartbeat signal will automatically transmit any text messages, or other data, that was sent or received since the last heartbeat signal. In addition, the user may manually initiate the transmission of text messages or other data. The text data, or any form of message data (e.g. audio, image, video, and the like), can also include location data, signal strength data, and any other component of the heartbeat signal. Thus, the heartbeat signal is intended to provide a minimum level of contact with the APs 448 in the venue 440. The UE 400 can send and receive data more frequently than the selected heartbeat rate. Furthermore, if the user makes any purchases within the venue 440, the system 500 may receive purchase data associated with the UE 400 in step 524. These various forms of data (e.g., heartbeat signal, message data, and purchase data) are provided to the database in step 526. As noted above, the data may be received by the customer database 506 and maintained therein for a standalone system or relayed to the database server 470 in the JUMMMP Cloud 456.

In step 528, the database (e.g., the database server 470 or customer database 506) develops a profile based on the received information as well as the downloaded profile data. As those skilled in the art will appreciate, the downloaded profile data may already have a well-developed data profile for the owner of the UE 400. The additional data collected on the present visit to the venue 440 may be used to supplement or further refine the user profile. If the UE 400 is a first time visitor to the venue 440, the profile from the database server 470 may have been developed from prior visits to other venues. Thus, the collection of customer data associated with a particular one of the UEs 400 can be developed based on visits to multiple venues.

In step 530, the venue 440 may provide advertising data to the UE 400 based on the profile developed in step 528. As discussed above, data analysis or data analytics, such as may be provided by the data analysis module 471 in FIG. 8, may be required to develop the profile. Following the delivery of advertising data in step 530, the process ends at 532. However, those skilled in the art will appreciate that the system will continue to track the UE 400 so long as it remains within the venue 440. Thus, additional heartbeat signals, message data, and purchase data may be received and incorporated into the profile. As will be discussed in greater detail below, the system 500 also tracks user actions based on the receipt of advertising data. For example, the system 500 will track the rate of redemption of coupons or other sale offers. This data also becomes part of the user profile. Returning again to FIG. 11, the profile has been developed in step 528. The profile is stored in step 534 and the profile development process ends at 536. As noted above, the profile may be stored locally in the customer database 506 or stored on the database server 470 in the JUMMMP Cloud 456.

The system described herein may also assist in the actual purchase of merchandise within the shopping venue 440. In some conventional technologies, a cell phone may include a near-field communicator (NFC) to permit commercial transactions. Devices equipped with an NFC simply bring the cell phone into very close proximity with an NFC device within the shopping venue. In some cases, the user simply taps the NFC point-of-sales (POS) terminal within the store. Those skilled in the art will appreciate that this approach requires special communicators within the cell phone and within the retail facility in the form of an NFC POS.

In contrast, the system described herein utilizes the short-range transceiver 176 (see FIG. 2) common in most wireless communication devices. As described in detail above, each wireless communication device is automatically authenticated when it enters the shopping venue 440. Thus, there is a reasonable degree of certainty that the device that will be used in the purchase has been properly identified and authenticated. In an exemplary embodiment, a communication shell can be downloaded to the UE 400. The communication shell can be downloaded from one of the APs 448 in the venue 440, or downloaded from an application store operated by the manufacturer of the UE 400. In either case, the communication shell operates only in conjunction with the APs 448 in the shopping venue 440. In this embodiment, the venue processor 508 (see FIG. 10) hosts the secure website and contains all the necessary software for transaction processing. The communication shell is configured to display data options for the user.

The communication shell in the UE 400 may be used to access and communicate with a secure website implemented by the venue processor 508 located at, and controlled by, the venue 440 (see FIG. 5). The communication shell permits the UE 400 to communicate with the AP 448 in the manner described above. The communication shell permits a web browser function on the UE 400 to access the secure website. Those skilled in the art will appreciate that communication with the secure website can be established using a secure communication socket such as, by way of example, https protocol to provide the desired security. The actual communication between the UE 400 and the secure website may be accomplished using conventional communication protocols, such as TCP/IP.

In this embodiment, all sales operations are processed by the secure website. For example, the UE 400 may view an initial web page at the secure website to select a particular sales activity (e.g., purchase, exchange, return, and the like). Those choices may typically be displayed on the UE 400 in the form of links that are selectable by the user. If, for example, the display 154 (see FIG. 2) of the user selects a link labeled "purchase," the secure website may download data to the browser on the UE 400 to provide additional links. Again, the user may select a particular product to purchase by selecting one of the links. Similarly, the user can select a link to pay for previously selected items in a "shopping cart" by activating a different link in a designated location on the display 154 of the UE 400.

Those skilled in the art will appreciate that the secure website 508 may download a plurality of data files to the UE 400 with different data formats, as is customary with any website. For example, the secure website 508 may download data files using a TIF, GIF, JPEG, flash, or other file types, alone or in combination. The present invention is not limited by the specific type of data file downloaded from the secure website hosted by the venue processor 508 to the UE 400. In an exemplary embodiment, the shopping experience wirelessly conducted via the secure website hosted by the venue processor 508 is visually, audibly, and functionally equivalent to a similar software application program downloaded to the UE 400 and executing locally on the UE. The goal is to provide the same shopping experience to the user irrespective of the actual location of the application software. Thus, the user will have the same shopping experience if the software application is downloaded to the UE 400, or if the software application is executing on the venue processor 508 and the UE 400 simply has a communication shell to interact with the venue processor, or if the communication shell on the UE 400 communicates with the secure website hosted by the venue processor 508 or some other server within the venue.

With the secure website, the virtual user's credit/debit card and user account information is stored on the secure website. Because the secure website is tied into the authentication server 504 and customer database 506, information regarding the user of the UE 400 is readily available. This provides a simple way to verify the amount of money available for purchasing or to credit and debit the virtual user's account. These collective functions allow the UE 400 to act as a digital wallet within the retail store, or any venue 440 associated with the JUMMMP Cloud 456 (see FIG. 8).

In another aspect, the collected customer data may be used to provide rewards to customers beyond the advertising described above. The customer database 506 (or database server 470 in FIG. 8) can reward customers who frequent the department store venue, who stay in the store for long periods of time, and who purchase items in the store.

Reward points may also be provided to users in the form of a game where shoppers are encouraged to browse throughout the venue. Using the example of FIG. 7, the venue 440 can provide navigational instructions to the user to guide them to predetermined locations within the venue 440. As the shopper moves to one department or another, the shopper can "pull" advertisements related to that location. In another aspect, the display 154 (see FIG. 2) can illustrate the diagram of FIG. 7 as a map of the venue 440. In this embodiment, the navigational instructions may be provided in the form of, by way of example, directional arrows to indicate the direction in which the user should move. As the user arrives in a particular department, a graphical designator, such as a bubble, can appear on the display for each department. The user can click on an associated bubble to pull the targeted advertisements associated with that particular department.

Thus, the more the customer walks through the store and the more time that the customer spends in the store, the more redeemable points they get. This is similar to frequent flyer miles programs that reward repeat customers.

The accumulation of reward points can be confined to a single venue, such as the department store venue 440 described above. In this example, the customer can receive additional reward points for visiting various departments within the department store venue as well as the related businesses 442-446 illustrated in FIG. 5. For example, the customer can earn additional reward points for visiting every department within a retail store. In another example, the venue 440 in FIG. 5 may represent a shopping mall and the related businesses 442-446 operate individual stores within the shopping mall. In this example, a customer could earn additional reward points for visiting every store in the mall or other property. There can be rewards, such as free products or services or discounts on products or services based on the number of accumulated reward points that can be redeemed within the venue 440.

The customer activity within the venue 440 can be measured in a number of different ways, as described above. In an exemplary embodiment, the customer database 506 or database server 470 of FIG. 8 can provide an overall measure of customer activity, including purchases. This measurement may be referred to as the customer's "retail DNA." An individual's retail DNA is essentially a measure of the user's shopping activity within the venue and can be based on a number of factors, such as the amount of time spent within the shopping venue 440, the amount of money spent within the shopping venue 440, user acceptance and utilization of ads, coupons, redeemed promotional offers, and the like. The customer database 506 or database server 470 in FIG. 8 accumulates and analyzes the various statistics to generate a retail DNA value for each customer. A customer with a high retail DNA rating is more valuable to the shopping venue 440 than a customer with a relatively low retail DNA rating.

Figure 12:
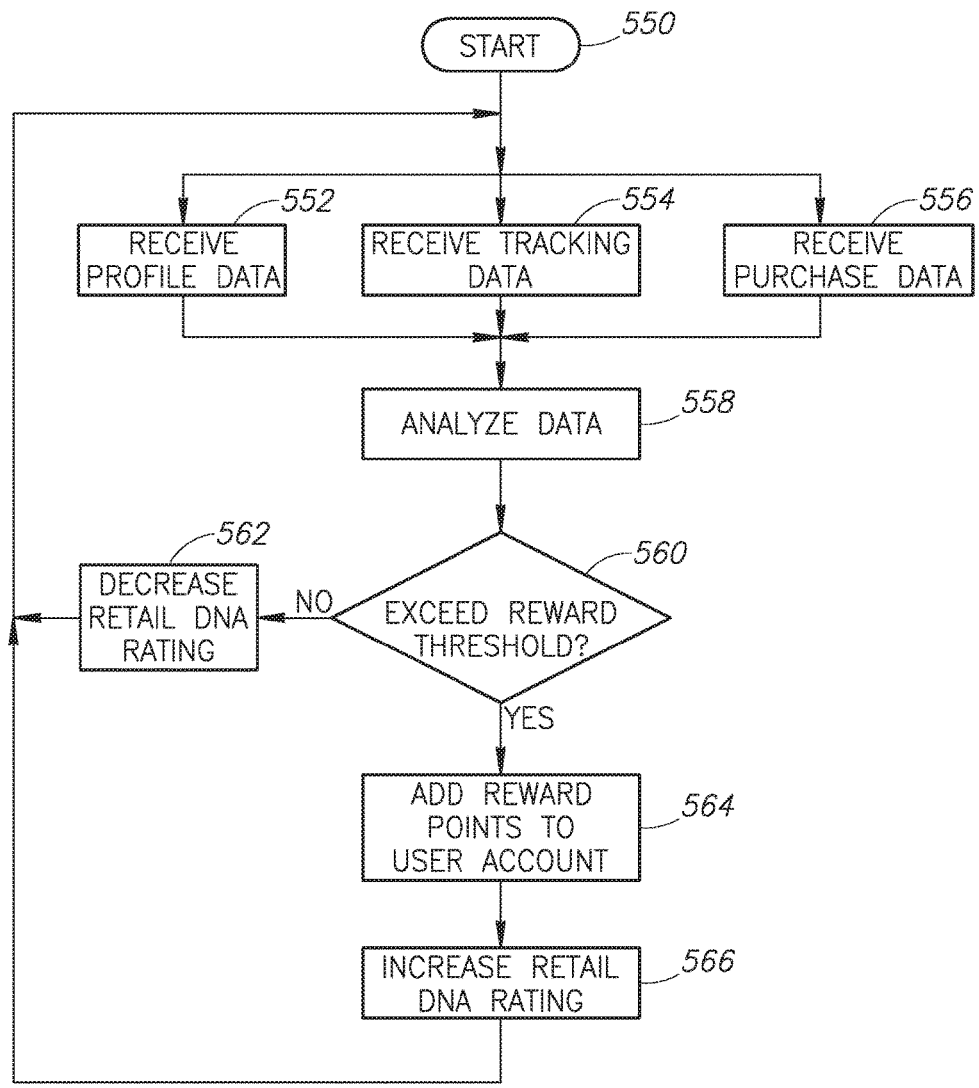
FIG. 12 is a flow chart illustrating reward points used with the system of FIG. 10.

The retail DNA rating system is illustrated, in an exemplary embodiment, in the flow chart of FIG. 12 where at a start 550, a customer rewards account has already been established. Those skilled in the art will appreciate that this may be combined with, or in addition to a customer credit card account or a virtual store credit/debit account. Alternatively, a user of the UE 400 may have a general account whose information is stored on the database server 470 (see FIG. 8). With a centralized customer rewards account, it is unnecessary for the user to establish individual accounts at each shopping venue 440.

When the UE 400 enters the venue 440, a registration process automatically occurs in the manner described above. In response to the authentication of the UE, the venue processor 508 (see FIG. 10) receives the customer profile data from the customer database 506 or from the database server 470 (see FIG. 8). In addition, the venue processor 508 receives tracking data in step 554. As described above, the tracking data may be included in the periodic heartbeat signal transmitted from the UE 400. Thus, step 554 of receiving tracking data is periodically repeated so long as the UE 400 is within the venue 440. In addition, if the user purchases any merchandise within the venue, the venue processor 508 receives the purchase data in step 556. Furthermore, additional information in the form of the user profile can also be included in the data analysis of step 558. Also, the API or application program on the UE 400 can allow the shopper to log onto social networks, such as Facebook, Twitter, and the like, to permit the API or application to extract user information associated therewith and to provide this information to the customer database 506 (see FIG. 10) to be used in the analysis of data in step 558.

In step 558, the venue processor 508, or the analysis module 471 of FIG. 8, analyzes the data in step 558. As discussed above, the analysis can be based on tracking data, such as how long the UE 400 is within the venue 440 or within a particular department within the venue, how many departments within the venue have been visited by the UE 400, and purchases made by the user of the UE 400. Furthermore, the analysis can include a measure of user responsiveness to advertising, such as coupon redemption rates.

In decision 560, it is determined whether the data exceeds a reward threshold for the UE 400. The threshold can be based on a totality of factors, some of which have been described above. Alternatively, each venue has the opportunity to provide greater weight to selected factors. For example, one venue may place a greater relative value on the length of time that a user spends within the venue while another venue may provide a greater relative weight to factors such as coupon redemption.

If the analysis does not exceed a reward threshold value, the result of decision 560 is NO and, in step 562, the venue processor 508 can decrease the retail DNA rating for the particular UE 400. Following the completion of step 562, the flow returns to steps 552-556 to continue receiving and analyzing data so long as the UE 400 is within the venue 440.

If the results of the data analysis indicate that the score exceeds a reward threshold, the result of decision 560 is YES and, in step 564, the venue processor 508 adds reward points to the user account. In step 566, the venue processor 508 can increase the retail DNA rating for the user of the UE 400. The process returns to steps 552-556 and continues to receive and analyze data so long as the UE 400 is within the venue 440.

In addition to reward point provided to a user, the increased retail DNA rating may qualify the user for better sale opportunities. The retail DNA rating for the user of the UE 400 is cumulative, so when a shopper walks in the door of the venue 440, the previous retail DNA rating should be the starting point for the current visit. For example, the shopping venue 440 can provide greater discounts or better sales for its most valued customers. Thus, a high retail DNA rating may be beneficial to the user because it results in better sales opportunities. Conversely, a customer with a low retail DNA rating may not receive the level of discounts or the number of sales opportunities because they are less likely to make an actual purchase based on the sales opportunities. Thus, part of the algorithm for the retail DNA rating includes a term that is related to the number of presented discounts, offers, and the like that are actually redeemed by the shopper. If the shopper does not redeem any offers, then it could significantly adversely affect the retail DNA rating. Those skilled in the art will appreciate that the retail DNA rating can be properly weighted to take into account other spending habits of the shopper even while ignoring the offers. That is, a shopper who spends a lot of money in the store, but ignores many or all of the offered advertising, may still have a high DNA rating.

Those skilled in the art will appreciate that the customer database 506 or the database server 470 can portray the retail DNA rating in a variety of different manners. For example, the retail DNA value could be expressed on a scale from 1-10 with a rating of one indicating a low rating for the customer retail DNA while a value of ten indicates a very high rating for the customer retail DNA. In yet another embodiment, the database server 470 (see FIG. 8) or customer database 506 can provide a graphic indication of a retail DNA rating for a customer. The graphic representation could be a bar graph with a higher bar graph value indicating a higher retail DNA rating. In yet another alternative embodiment, color graphical representations may be used to indicate a retail DNA rating. For example, a bar graph could indicate a red value for a low retail DNA rating, a yellow graphical representation for a medium level retail DNA rating and a green indication for a high level for the retail DNA rating. In yet another embodiment, the database server 470 or customer database 506 can include a graphical outline or image of a customer and indicate the retail DNA rating using the color scheme described above where the color changes from red to green as the retail DNA rating increases. Those skilled in the art will recognize that other techniques may be used to provide an indication of the retail DNA rating for a particular customer.

In yet another embodiment, the presence of a customer with a high retail DNA rating may trigger an alert in the store. An authorized individual in the store can generate an ad hoc discount directed specifically to the individual with the high retail DNA rating. For example, an individual who has frequently made purchases in the shopping venue in the past may be provided with an individualized sales opportunity (e.g., 25% off any jewelry purchase made within the next 60 minutes) that are unique to that individual.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter medial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method for the control of a plurality of wireless communication devices inside a shopping venue wherein each of the plurality of wireless communication devices includes a network transceiver to communicate with a cellular network and a short-range transceiver to communicate with other than the cellular network, the method comprising:

as part of an initial registration, receiving identification data provided by a user, the identification data comprising a telephone identification (ID), a device ID, and a user ID associated with each of the plurality of wireless communication devices;

storing the received identification data in an authentication server;

each of the plurality of wireless communication devices downloading an application program interface (API) to control operation of the respective wireless communication devices;

at a time subsequent to the initial registration, transmitting a beacon signal from each of a plurality of wireless access points for detection by any of the plurality of wireless communications devices, the plurality of wireless access points being distributed throughout the inside of the shopping venue and transmitting a predetermined beacon signal having an identical subscriber set identifier (SSID) portion;

under control of the API, the short range transceiver in each of the plurality of wireless communication devices being configured to detect the transmitted beacon signal and verify the beacon signal as the predetermined beacon signal and, upon verification of the beacon signal as the predetermined beacon signal, automatically generating and transmitting, without human intervention, an authentication request;

at a first of the plurality of access points, receiving the authentication request automatically generated and transmitted from the short-range transceiver of any of the plurality of unauthenticated wireless communications devices that detects the transmitted beacon signal as the wireless communication device enters the inside of the shopping venue, each authentication request including identification data associated with the wireless communication device that is transmitting the authentication request wherein the wireless communication device initiates an authentication process by identifying the predetermined beacon signal and transmitting the authentication request;

the first of the plurality of wireless access points providing the authentication request and identification data to the authentication server to determine if the identification data matches a previously registered user;

if the authentication server determines that the identification data matches a previously registered user, then authenticating the wireless communication device associated with that user;

upon authentication of the wireless communication device, establishing a bi-directional communication link between the first of the plurality of access points and the authenticated wireless communication device, to thereby form a short-range communication network including the authenticated wireless communication device and at least a portion of the plurality of access points, and transmitting data thereto using the short-range transceiver in the authenticated wireless communication device and without using the network transceiver or the cellular network;

as long as the short-range transceiver is within range of any of the plurality of access points in the short-range communication network, receiving a heartbeat signal automatically transmitted from the authenticated wireless communication device using the communication link, the heartbeat signal including location data for the authenticated wireless communication device and time stamp data, the location data being determined based on a signal strength of signals from a plurality of wireless access points within the venue;

determining a location of the wireless communication device within the shopping venue based on the received heartbeat signal; and transmitting navigational directions from at least one of the plurality of access points that comprise the short-range communication network to the authenticated wireless communication device to thereby provide navigational guidance within the venue.

2. The method of claim 1, further comprising associating a user account with the registered user and using the user account to make purchases in the shopping venue.

3. The method of claim 2, further comprising using the wireless communication device associated with the user account to make purchases in the shopping venue.

4. The method of claim 1 wherein the authentication server is associated with the shopping venue.

5. The method of claim 1 wherein at least a portion of the plurality of access points are associated with different shopping venues and receiving the authentication request comprises: receiving the authentication request at any of a first portion of the plurality of access points associated with a first shopping venue from any of the plurality of wireless communication devices that detected the transmitted signal from any of the plurality of access points associated with the first venue; and receiving the authentication request at any of a second portion of the plurality of access points associated with a second venue from any of the plurality of wireless communication devices that detected the transmitted signal from any of the plurality of access points associated with the second venue.

6. The method of claim 5 wherein the authentication server is configured to process authentication requests for the first and second venues, and providing the authentication request and identification data to the authentication server comprises providing the authentication request and identification data from the access points associated with the first venue to the authentication server and providing the authentication request and identification data from the access points associated with the second venue to the authentication server.

7. The method of claim 6, further comprising associating a user account with the registered user and using the user account to make purchases in the first and second venues.

8. The method of claim 7, further comprising using the wireless communication device associated with the user account to make purchases in the first and second venues.

9. The method of claim 1, further comprising establishing a user profile based on the location of the wireless communication device within the shopping venue.

10. The method of claim 9, further comprising transmitting advertising data from the shopping venue to the authenticated wireless communication device via the communication link with the access point, the advertising data being based on the user profile.

11. The method of claim 1, further comprising establishing a user profile based on an amount of time of the wireless communication device within the shopping venue.

12. The method of claim 11, further comprising transmitting advertising data from the shopping venue to the authenticated wireless communication device via the communication link with the access point, the advertising data being based on the user profile.

13. The method of claim 1, further comprising establishing a user profile based on a purchase made by the user of the wireless communication device within the shopping venue.

14. The method of claim 13, further comprising transmitting advertising data from the shopping venue to the authenticated wireless communication device via the communication link with the access point, the advertising data being based on the user profile.

15. The method of claim 1, further comprising establishing a user profile based on information provided by the user of the wireless communication device.

16. The method of claim 15, further comprising transmitting advertising data from the shopping venue to the authenticated wireless communication device via the communication link with the access point, the advertising data being based on the user profile.

17. The method of claim 1, further comprising establishing a user profile based on one user factor selected from a group of factors comprising the location of the wireless communication device within the shopping venue, an amount of time of the wireless communication device within the shopping venue, information provided by the user of the wireless communication device, and a purchase made by the user of the wireless communication device within the shopping venue.

18. The method of claim 17, further comprising transmitting advertising data from the shopping venue to the authenticated wireless communication device via the communication link with the access point, the advertising data being based on the user profile.

19. The method of claim 1, further comprising establishing a user profile based on a plurality of user factors selected from a group of factors comprising the location of the wireless communication device within the shopping venue, an amount of time of the wireless communication device within the shopping venue, information provided by the user of the wireless communication device, and a purchase made by the user of the wireless communication device within the shopping venue.

20. The method of claim 19, further comprising transmitting advertising data from the shopping venue to the authenticated wireless communication device via the communication link with the access point, the advertising data being based on the user profile.

21. The method of claim 1, further comprising establishing a retail DNA rating for a user based on user activity with the venue and sending advertising data to the wireless communication device based on the retail DNA rating.

22. The method of claim 21 wherein the retail DNA rating is established based on a plurality of user factors selected from a group of factors comprising, an amount of time of the wireless communication device within the shopping venue, purchases made in response to advertising data sent to the wireless communication device, and a monetary amount spent in the venue.

23. The method of claim 1 wherein transmitting data from the shopping venue via the communication link comprises transmitting advertising data to the authenticated wireless communication device for display on a display of the wireless communication device.

24. The method of claim 23 wherein transmitting the advertising data from the shopping venue via the communication link is in response to a request for the advertising data received from the authenticated wireless communication device.

25. The method of claim 23 wherein transmitting the advertising data from the shopping venue via the communication link independent of any request for the advertising data received from the authenticated wireless communication device.

26. The method of claim 1 wherein transmitting data to the wireless communication device via the communication link comprises transmitting web link data, the method further comprising receiving a connection request from the wireless communication device to connect to a web site associated with the web link data.

27. The method of claim 1 wherein the plurality of wireless access points are associated with the shopping venue and using the short-range transceiver to detect the wireless access point associated with the shopping venue comprises using the short-range transceiver to detect any of the plurality of wireless access points associated with the shopping venue.

28. The method of claim 27 wherein establishing the communication link with the access point comprises establishing a communication link with any of the plurality of wireless access points associated with the shopping venue and receiving data therefrom.

29. The method of claim 28 wherein establishing the communication link with the access point comprises establishing the communication link between the wireless communication device and the first of the plurality of wireless access points associated with the shopping venue and transmitting data thereto, the method further comprising maintaining the communication link between the wireless communication device and others of the plurality of wireless access points associated with the shopping venue as the wireless communication device moves out of range of the first of the plurality of wireless access points associated with the shopping venue.

30. The method of claim 1 wherein receiving the heartbeat signal comprises receiving signal strength data from the wireless communication device indicative of a signal strength of signals received by the wireless communication device from ones of the plurality of wireless access points associated with the shopping venue.

31. The method of claim 30, further comprising determining the location of the wireless communication device within the venue based on the received signal strength data.

32. The method of claim 31 wherein determining the location of the wireless communication device within the venue based on the received signal strength data comprises using a data storage structure having predetermined signal strength values corresponding to predetermined locations within the venue.

* * * * *